US012633043B1

(12) United States Patent

Belli et al.

(10) Patent No.: US 12,633,043 B1

(45) **Date of Patent: \*May 19, 2026**

(54) COARSE DEPTH TEST IN GRAPHICS PROCESSING SYSTEMS

(71) Applicant: Imagination Technologies Limited, Kings Langley (GB)

(72) Inventors: Lorenzo Belli, Watford (GB); Robert Brigg, Watford (GB)

(73) Assignee: Imagination Technologies Limited, Kings Langley (GB)

( * ) Notice: Subject to any disclaimer, the term of this patent is extended or adjusted under 35 U.S.C. 154(b) by 19 days.

This patent is subject to a terminal disclaimer.

(21) Appl. No.: 18/594,863

(22) Filed: Mar. 4, 2024

Related U.S. Application Data

(63) Continuation of application No. 17/516,274, filed on Nov. 1, 2021, now Pat. No. 11,922,566, which is a (Continued)

(30) Foreign Application Priority Data

Jun. 19, 2019 (GB) ...................................... 1908807
Jun. 19, 2019 (GB) ...................................... 1908812

(51) Int. Cl.
*G06T 15/40* (2011.01)
*G06F 7/24* (2006.01)
(Continued)

(52) U.S. Cl.
CPC .............. *G06T 15/405* (2013.01); *G06F 7/24* (2013.01); *G06F 9/4881* (2013.01); *G06T 1/60* (2013.01);
(Continued)

(58) Field of Classification Search
None
See application file for complete search history.

(56) References Cited

U.S. PATENT DOCUMENTS 6,646,639 B1 11/2003 Greene et al.
7,023,437 B1 4/2006 Voorhies et al.
(Continued)

FOREIGN PATENT DOCUMENTS

GB 2510964 B 4/2015
GB 2524121 B 3/2016
WO 00/70561 A1 11/2000

OTHER PUBLICATIONS

Akenine-Moeller et al., "Graphics for the Masses: A Hardware Rasterization Architecture for Mobile Phones," Computer Graphics Proceedings, Jul. 2003, pp. 801-808.

(Continued)

*Primary Examiner* — Frank S Chen
(74) *Attorney, Agent, or Firm* — Potomac Law Group, PLLC; Vincent M DeLuca

(57) ABSTRACT

Coarse depth testing is performed in a graphics processing system having a rendering space divided into a plurality of tiles. A depth range for a tile identifies a depth range based on primitives previously processed. A determination is made based on the depth range as to whether all or a portion of a primitive is hidden in the tile. If at least a portion is not hidden in the tile, a determination is made as to whether the primitive or a primitive fragment thereof has better depth than the primitives previously processed. If so, the primitive or primitive fragment is identified as not requiring a read of a depth buffer to perform full resolution depth testing, such that a determination that at least a portion of the primitive is hidden in the tile causes full resolution depth testing not to be performed on at least that portion of the primitive.

20 Claims, 24 Drawing Sheets

Related U.S. Application Data continuation of application No. 16/906,170, filed on Jun. 19, 2020, now Pat. No. 11,164,364.

(51) Int. Cl.

| | |
|---|---|
| *G06F 9/48* | (2006.01) |
| *G06T 1/60* | (2006.01) |
| *G06T 7/50* | (2017.01) |
| *G06T 15/20* | (2011.01) |
| *G06T 17/10* | (2006.01) |

(52) U.S. Cl.

CPC .............. *G06T 7/50* (2017.01); *G06T 15/20* (2013.01); *G06T 15/40* (2013.01); *G06T 17/10* (2013.01); *G06T 2207/10028* (2013.01); *G06T 2207/20021* (2013.01)

(56) References Cited

U.S. PATENT DOCUMENTS

| | | | |
|---|---|---|---|
| 7,333,106 | B1 | 2/2008 | Wu et al. |
| 9,576,396 | B2 * | 2/2017 | Park ........................... G06T 1/20 |
| 9,922,450 | B2 | 3/2018 | Morphet |
| 2002/0196252 | A1 | 12/2002 | Liao et al. |
| 2005/0122338 | A1 | 6/2005 | Hong et al. |
| 2006/0209078 | A1 | 9/2006 | Anderson et al. |
| 2008/0170066 | A1 | 7/2008 | Falchetto |
| 2010/0007662 | A1 | 1/2010 | Cox et al. |
| 2012/0299910 | A1 | 11/2012 | Liang |
| 2014/0176544 | A1 | 6/2014 | Fishwick et al. |
| 2014/0354654 | A1 | 12/2014 | Heggelund et al. |
| 2015/0161815 | A1 | 6/2015 | Andersson et al. |
| 2015/0363968 | A1 | 12/2015 | Yang et al. |
| 2016/0005208 | A1 | 1/2016 | Liao et al. |
| 2016/0098856 | A1 | 4/2016 | Broadhurst et al. |
| 2016/0098858 | A1 | 4/2016 | Broadhurst et al. |
| 2016/0239939 | A1 | 8/2016 | Kakarlapudi et al. |
| 2017/0091987 | A1 | 3/2017 | Morphet |
| 2018/0082431 | A1 | 3/2018 | Andersson et al. |
| 2018/0082469 | A1 | 3/2018 | Andersson et al. |
| 2018/0082488 | A1 | 3/2018 | Akenine-Moller et al. |
| 2018/0349315 | A1 | 12/2018 | Heggelund et al. |

OTHER PUBLICATIONS

Anderson et al., "Masked Depth Culling for Graphics Hardware," ACM Transactions on Graphics, vol. 34, No. 6, Oct. 2, 2015, pp. 1-9.

* cited by examiner

2100

COARSE DEPTH TEST IN GRAPHICS PROCESSING SYSTEMS

CROSS-REFERENCE TO RELATED APPLICATIONS AND CLAIM OF PRIORITY

This application is a continuation under 35 U.S.C. 120 of application Ser. No. 17/516,274 filed Nov. 1, 2021, now U.S. Pat. No. 11,922,566, which is a continuation of prior application Ser. No. 16/906,170 filed Jun. 19, 2020, now U.S. Pat. No. 11,164,364, which claims foreign priority under 35 U.S.C. 119 from United Kingdom Application Nos. 1908807.9 and 19008812.9, both filed Jun. 19, 2019, the contents of which are incorporated by reference herein in their entirety.

BACKGROUND

Graphics processing systems are configured to receive graphics data, e.g. from an application (e.g. a game application) running on a computer system, and to render an image from the graphics data to provide a rendering output. For example, an application may generate a 3D model of a scene and output geometry data representing the objects in the scene. In particular, the application may represent each object using one or more primitives (i.e. simple geometric shapes, such as, but not limited to rectangles, triangles, lines and points to which a texture can be applied) which are defined by the position of one or more vertices. In these cases, the geometry data output by the application may include information identifying each vertex (e.g. the coordinates of the vertex in world space) and information indicating the primitives formed by the vertices. The graphics processing system then converts the received geometry data into an image that may be displayed on the screen.

A graphics processing system may, for example, implement immediate mode rendering (IMR) or tile-based rendering (TBR). In IMR the entire scene is rendered as a whole. In contrast, in TBR a scene is rendered using a rendering space which is divided into subsections or subregions, which are referred to as tiles, wherein at least a portion of the rendering process may be performed independently for each tile. The tiles may have any suitable shape, but are typically rectangular (wherein the term "rectangular" includes square). An advantage of TBR is that fast, on-chip memory can be used during the rendering for colour, depth and stencil buffer operations, which allows a significant reduction in system memory bandwidth over IMR, without requiring on-chip memory that is large enough to store data for the entire scene at the same time.

TBR involves two key phases: a geometry processing phase; and a rasterization phase. During the geometry processing phase the geometry data (e.g. vertices defining primitives) received from an application (e.g. a game application) is transformed from world space coordinates into screen space coordinates. A per-tile list is then created of the transformed primitives (e.g. triangles) that fall at least partially within the bounds of the tile. During the rasterization phase each tile is rendered separately (i.e. the transformed primitives are mapped to pixels and the colour is identified for each pixel in the tile). This may comprise identifying which primitive(s) are visible at each pixel. The colour of each pixel may then be determined by the appearance of the visible primitive(s) at that pixel which may be defined by a texture applied at that pixel and/or the pixel shader program run on that pixel. A pixel shader program describes operations that are to be performed for given pixels. Rendering each tile separately enables the graphics processing system to only retrieve the transformed primitive data related to a particular tile when rendering that tile in the rasterization phase, which keeps bandwidth requirements for the memory (e.g. intermediate buffer) low. Once a colour value has been identified for each pixel in a tile the colour values for the tile are written out to memory (e.g. a frame buffer). Once the entire scene has been rendered (i.e. once colour values have been determined for the pixels of all of the tiles) the scene may be, for example, displayed on a screen.

FIG. 1 illustrates an example TBR graphics processing system 100. The system 100 comprises memory $102_1$, $102_2$, $102_3$, $102_4$, geometry processing logic 104 and rasterization logic 106. Two or more of the memories $102_1$, $102_2$, $102_3$, and $102_4$ may be implemented in the same physical unit of memory.

The geometry processing logic 104 implements the geometry processing phase of TBR. The geometry processing logic 104 comprises transformation logic 108 and a tiling engine 110. The transformation logic 108 receives geometry data (e.g. vertices, primitives and/or patches) from an application (e.g. a game application) and transforms the geometry data into the rendering space (e.g. screen space). The transformation logic 108 may also perform functions such as clipping and culling to remove geometry data (e.g. primitives or patches) that falls outside of a viewing frustum, and/or apply lighting/attribute processing as is known to those of skill in the art. The transformed geometry data (e.g. vertices, primitives and/or patches) is (i) stored in the memory $102_2$, and (ii) provided to the tiling engine 110. The tiling engine 110 generates, from the transformed geometry data, a list, for each tile, of the transformed primitives that fall, at least partially, within that tile. The list may be referred to as a display list or a transformed display list. In some cases, the transformed display lists comprise pointers or links to the transformed geometry data (e.g. vertex data) related to the primitives that, at least partially, fall within the tile.

The rasterization logic 106 implements the rasterization phase of TBR. Specifically, the rasterization logic 106 renders the primitives in a tile-by-tile manner by fetching the display list for a tile from memory $102_3$ and then fetching the transformed geometry data from memory $102_2$ for the primitives that fall within the tile as indicated by the display list for that tile; and rendering the primitives for that tile based on the transformed geometry data.

In some cases, the rasterization logic 106 may comprise a rasterizer 112, hidden surface removal (HSR) logic 114 and texturing/shading logic 116. In these cases, the rasterizer 112 fetches each of the display lists from memory $102_3$ and for each display list fetches the transformed geometry data from memory $102_2$ for the primitives that fall within a tile as specified by the corresponding display list, and converts each primitive into a set of primitive fragments. The term "fragment" is used herein to mean a sample of a primitive at a sampling point, which is to be processed to render pixels of an image. In some examples, there may be a one-to-one mapping of pixels to fragments. However, in other examples there may be more fragments than pixels, and this oversampling can allow for higher quality rendering of pixel values, e.g. by facilitating anti-aliasing and other filters that may be applied to multiple fragments for rendering each of the pixel values.

The primitive fragments for a particular tile are then provided to the HSR logic 114 which removes primitive fragments which are hidden (e.g. hidden by other primitive fragments) by performing depth testing on the primitive fragments. The remaining fragments (after hidden surface removal) are then passed to the texturing/shading logic 116 which performs texturing and/or shading on the primitive fragments to determine pixel values of a rendered image. The rendered pixel values for a tile are then stored in memory $102_4$ (e.g. frame buffer).

The rasterization logic 106 processes each of the tiles and when the whole image has been rendered and stored in the memory $102_4$ (e.g. frame buffer) the image can be output from the graphics processing system 100 and used in any suitable manner, for example, displayed on a display, stored in memory, or transmitted to another device, etc. The TBR graphics processing system 100 shown in FIG. 1 is a "deferred" rendering system in the sense that fragments are processed by the HSR logic 114 before being processed by the texturing/shading logic 116. In other examples, the graphics processing system might not be a deferred rendering system in which case texturing/shading would be applied to fragments before HSR is applied to those fragments.

It is important to be able to perform the depth testing in an efficient manner.

The embodiments described below are provided by way of example only and are not limiting of implementations which solve any or all of the disadvantages of known methods and systems for performing depth testing in a graphics processing system.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and coarse depth test logic for performing coarse depth testing in a graphics processing system in which a rendering space is divided into a plurality of tiles. The method comprises: receiving a set of one or more primitives related to one of the plurality of tiles; obtaining a depth range for the tile, the depth range for the tile identifying a depth range based on primitives previously processed for the tile; and for at least one primitive in the set of one or more primitives: making a determination, based on the depth range for the tile, as to whether all or a portion of the primitive is hidden in the tile; in response to making a determination that at least a portion of the primitive is not hidden in the tile, making a determination, based on the depth range for the tile, as to whether the primitive, or one or more primitive fragments generated therefrom, has better depth than the primitives previously processed for the tile according to a depth compare mode; and in response to making a determination that the primitive or a primitive fragment has better depth than the primitives previously processed for the tile, identifying the primitive or the primitive fragment as not requiring a read of a depth buffer to perform full resolution depth testing, wherein if a determination is made that at least a portion of the primitive is hidden in the tile, full resolution depth testing is not performed on at least that portion of the primitive in respect of the tile.

A first aspect provides a method of performing coarse depth testing in a graphics processing system in which a rendering space is subdivided into a plurality of tiles, the method comprising: receiving a set of one or more primitives related to one of the plurality of tiles; obtaining a depth range for the tile, the depth range for the tile identifying a depth range based on primitives previously processed for the tile; and for at least one primitive in the set of one or more primitives: making a determination, based on the depth range for the tile, as to whether all or a portion of the primitive is hidden in the tile; in response to making a determination that at least a portion of the primitive is not hidden in the tile, making a determination, based on the depth range for the tile, as to whether the primitive, or one or more primitive fragments generated therefrom, has better depth than the primitives previously processed for the tile according to a depth compare mode; and in response to making a determination that the primitive or a primitive fragment has better depth than the primitives previously processed for the tile, identifying the primitive or the primitive fragment as not requiring a read of a depth buffer to perform full resolution depth testing, wherein if a determination is made that at least a portion of the primitive is hidden in the tile, full resolution depth testing is not performed on at least that portion of the primitive in respect of the tile.

A second aspect provides coarse depth test logic configured to perform coarse depth testing in a graphics processing system in which a rendering space is subdivided into a plurality of tiles, the coarse depth test logic comprising: hidden depth test logic configured to: receive a set of one or more primitives related to one of the plurality of tiles; obtain a depth range for the tile, the depth range for the tile identifying a depth range based on primitives previously processed for the tile; and for at least one primitive in the set of one or more primitives: make a determination, based on the depth range for the tile, as to whether all or a portion of the primitive is hidden in the tile, wherein if a determination is made that at least a portion of the primitive is hidden in the tile, full resolution depth testing is not performed on that portion of the primitive in respect of the tile; and in response to making a determination that at least a portion of the primitive is not hidden in the tile, outputting at least that portion of the primitive; and front depth test logic configured to receive the primitives output by the hidden depth test logic, or one or more primitive fragments generated therefrom, and for at least one of the received primitives or at least one of the primitive fragments: make a determination, based on the depth range for the tile, as to whether the primitive or primitive fragment has better depth than the primitives previously processed for the tile according to a depth compare mode; and in response to making a determination that the primitive or primitive fragment has better depth than the primitives previously processed for the tile, identifying the primitive or primitive fragment as not requiring a read of a depth buffer to perform full resolution depth testing.

A third aspect provides a graphics processing system configured to perform the method of the first aspect.

The coarse depth test logic and graphics processing systems described herein may be embodied in hardware on an integrated circuit. There may be provided a method of manufacturing, at an integrated circuit manufacturing system, the coarse depth test logic and/or the graphics processing systems described herein. There may be provided an integrated circuit definition dataset that, when processed in an integrated circuit manufacturing system, configures the system to manufacture a coarse depth test logic or a graphics processing system described herein. There may be provided a non-transitory computer readable storage medium having stored thereon a computer readable description of coarse depth test logic or a graphics processing system that, when processed in an integrated circuit manufacturing system, causes the integrated circuit manufacturing system to manufacture an integrated circuit embodying the coarse depth test logic or the graphics processing system.

There may be provided an integrated circuit manufacturing system comprising: a non-transitory computer readable storage medium having stored thereon a computer readable description of the coarse depth test logic or the graphics processing system described herein; a layout processing system configured to process the computer readable description so as to generate a circuit layout description of an integrated circuit embodying the coarse depth test logic or the graphics processing system; and an integrated circuit generation system configured to manufacture the coarse depth test logic or the graphics processing system according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
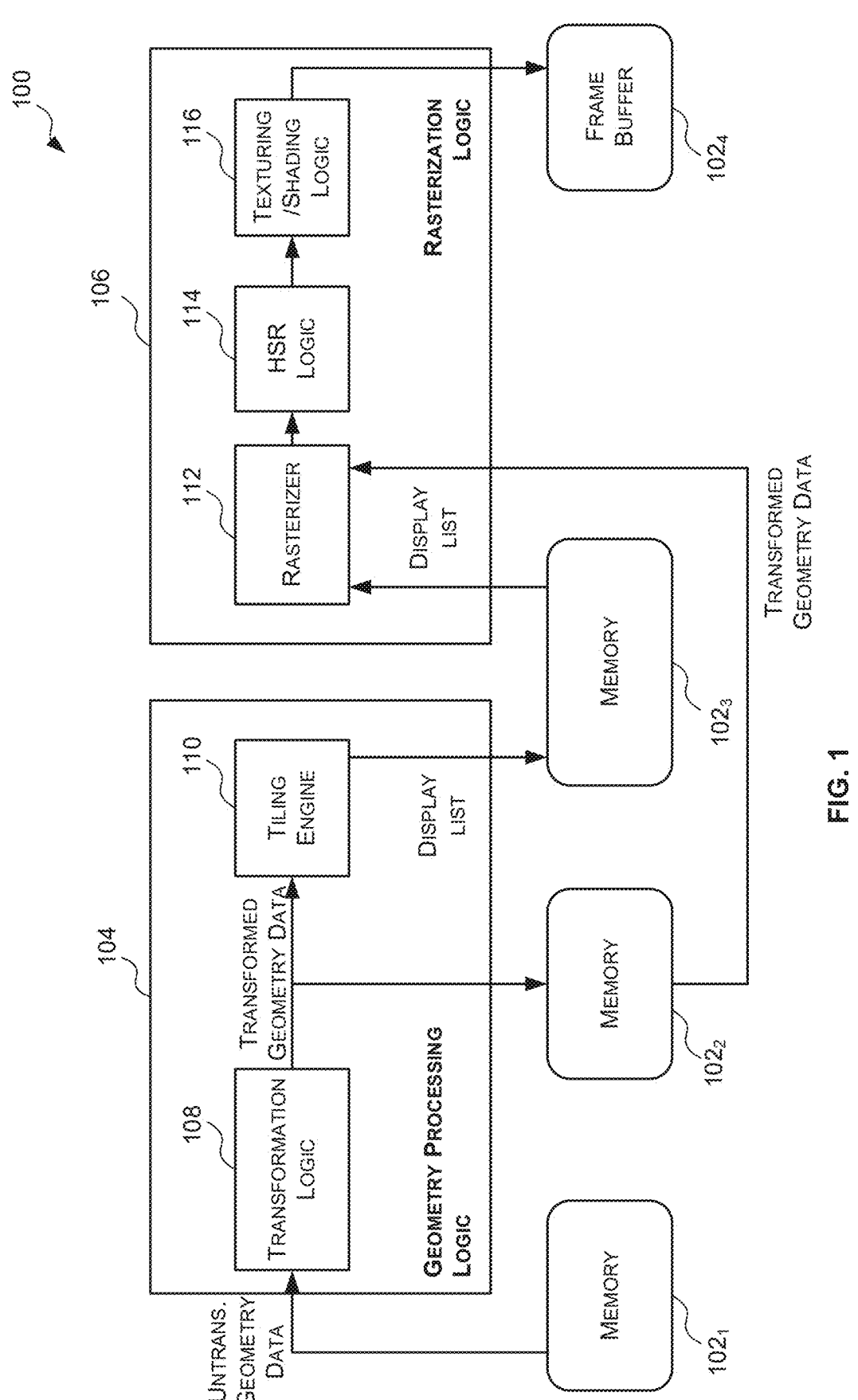
FIG. 1 is a block diagram of an example tile-based rendering graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

As described above, by rendering each tile separately a TBR graphics processing system only has to retrieve the transformed primitive data related to a particular tile when rendering that tile in the rasterization phase, which keeps bandwidth requirements for the memory (e.g. intermediate buffer) to a minimum. However, TBR also has a number of disadvantages compared to immediate mode rendering. For example, TBR typically requires use of system memory for storing the transformed geometry data for an entire frame, which typically requires a significant amount of bandwidth for transferring data (e.g. transformed geometry data) between the chip on which the geometry processing logic 104 and rasterization logic 106 are implemented and the memory, which is typically situated "off-chip". Accordingly, to take advantage of some of the benefits of TBR while reducing some of the disadvantages associated therewith the applicant has developed a "hybrid rendering" technique, which as its name suggests, is a hybrid between immediate mode rendering and TBR.

In hybrid rendering the rendering space is divided into tiles and the primitives are associated with tiles like in TBR (although in some cases the tiles may be smaller). Accordingly in hybrid rendering there is also a geometry processing phase and a rasterization phase. However, while in TBR the display lists that are generated by the geometry processing phase, where possible, include a list of all of the transformed primitives that fall at least partially within a particular tile, in hybrid rendering the display lists generated by the geometry processing phase may include only a subset of the transformed primitives that fall at least partially within a particular tile for a particular render, thus they may be referred to herein as partial display lists. Specifically, in TBR, if possible, all the primitives are processed in the geometry processing phase and transformed primitives are stored in off-chip memory, and display lists are generated for each tile that refer to the transformed primitives stored in memory. In contrast, in hybrid rendering the transformed primitives are stored in a relatively small memory (e.g. on-chip memory, such as, a local buffer) and partial display lists are generated for respective tiles that refer to the transformed primitives in the small memory. The small memory (e.g. local buffer) is not intended to be necessarily large enough to store all of the transformed primitives for a render, so as transformed primitives are generated in the geometry processing phase they are stored in the small memory and partial display lists are built up for the transformed primitives stored in the small memory. Periodically partial display lists are provided to the rasterization phase so that some of the transformed primitives can be processed in the rasterization phase, such that they no longer need to be stored in (and can be removed from) the small memory, thereby freeing up a portion of the small memory. New transformed primitives are then stored in the free space in the small memory and the partial display lists continue to be built up based on the new transformed primitives. However, the partial display list for a particular tile may be sent to the rasterization phase before all of the transformed primitives for that tile have been stored in the small memory thus at least one subsequent partial list may be generated for that tile that comprises the transformed primitives that were stored in the small memory after the previous partial display list for that tile was provided to the rasterization phase.

Figure 2:
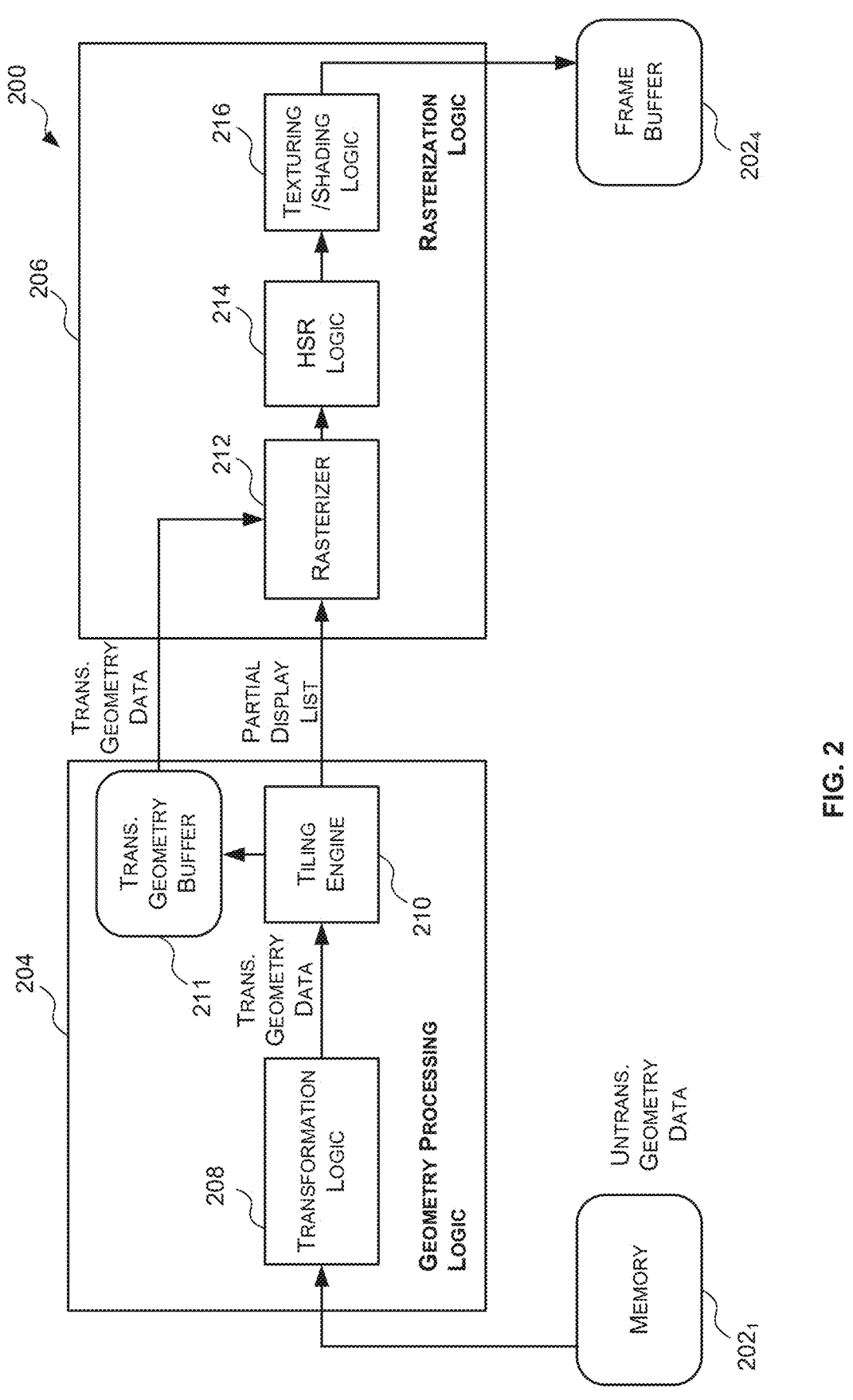
FIG. 2 is a block diagram of an example hybrid rendering graphics processing system.

FIG. 2 illustrates an example hybrid rendering graphics processing system 200. The graphics processing system 200 comprises memory 202₁, 202₄, geometry processing logic 204 and rasterization logic 206. The memories 202₁, and 202₄ may be implemented in the same physical unit of memory.

The geometry processing logic 204, like the geometry processing logic 104 of FIG. 1, implements the geometry processing phase. The geometry processing logic 204 comprises transformation logic 208 and a tiling engine 210. The transformation logic 208 operates in the same manner as the transformation logic 108 of FIG. 1. Specifically, the transformation logic 208 receives geometry data (e.g. vertices, primitives and/or patches) from an application (e.g. a game application) and transforms the geometry data into the rendering space (e.g. screen space). The transformation logic 208 may also perform functions such as clipping and culling to remove geometry data (e.g. primitives or patches) that falls outside of a viewing frustum, and/or apply lighting/attribute processing as is known to those of skill in the art.

The transformed geometry data (e.g. vertices, primitives and/or patches) is provided to the tiling engine 210.

The tiling engine 210 stores the transformed geometry data in a local transformed geometry buffer 211 and generates a list, for each tile, of the transformed primitives in the local transformed geometry buffer 211 that fall, at least partially within that tile. The list may be referred to as a partial display list. In some cases, the partial display list may comprise pointers or links to the transformed geometry data (e.g. vertex data) in the local transformed geometry buffer 211 related to the primitives that, at least partially, fall within the tile. The local transformed geometry buffer is not intended to be necessarily big enough to store all of the transformed geometry data to render a frame, so periodically (e.g. from time to time, e.g. at regular intervals, or when the transformed geometry buffer 211 becomes full or when the fullness of the transformed geometry buffer 211 is above a threshold) the tiling engine 210 sends one or more partial display lists to the rasterization logic 206 to thereby free up space in the buffer 211. As described above, this means that when a partial display list is provided to the rasterization logic 206 it may only comprise a portion of the primitives that fall within that tile (because some primitives that fall within the tile might not have been processed yet by the geometry processing logic 204).

The rasterization logic 206 implements the rasterization phase. Specifically, the rasterization logic 206 renders the primitives in a tile-by-tile manner by fetching the transformed geometry data from the local transformed geometry buffer 211 for the primitives that fall within the tile as indicated by the partial display list for that tile; and rendering the primitives for that tile based on the transformed geometry data.

In some cases, the rasterization logic 206 may comprise a rasterizer 212, hidden surface removal (HSR) logic 214 and texturing/shading logic 216. In these cases, the rasterizer 212 receives partial display lists from the tiling engine 210 and for each partial display list fetches the transformed geometry data from the local transformed geometry buffer 211 for the primitives that fall within a tile as specified by the partial display list, and converts each primitive into a set of primitive fragments.

The primitive fragments for a particular tile are then provided to the HSR logic 214 which removes primitive fragments which are hidden (e.g. hidden by other primitive fragments). The remaining fragments (after hidden surface removal) are then passed to the texturing/shading logic 216 which performs texturing and/or shading on the primitive fragments to determine pixel values of a rendered image. The rendered pixel values for a tile can then be stored in memory 202₄ (e.g. frame buffer).

When the whole image has been rendered and stored in the memory 202₄ (e.g. frame buffer) the image can be output from the graphics processing system 200 and used in any suitable manner, for example, displayed on a display, stored in memory, or transmitted to another device, etc.

Although the geometry processing logic is shown in the figures as being separate to the rasterization logic, in some implementations the geometry processing logic and the rasterization logic may share some resources. For example, the graphics processing system could use a unified shading approach wherein the same physical execution units can be used to execute instructions for use in the geometry processing phase (e.g. to perform vertex processing) and to execute instructions for use in the rasterization phase (e.g. to perform fragment processing).

In such hybrid rendering graphics processing systems each tile may be processed more than once in the rendering phase. For example, a first partial display list for a tile may be generated by the geometry processing phase which is then processed in the rasterization phase; subsequently a second partial display list for that same tile may be generated by the geometry processing phase which is then processed in the rasterization phase. Each time a partial display list is processed in the rasterization phase full resolution hidden surface removal is performed by the Hidden Surface Removal (HSR) logic to remove primitive fragments that are hidden. This may involve reading in a depth buffer for the tile stored in memory and comparing the depth value (e.g. Z value or Z co-ordinate) of each of the primitive fragments to the value in the depth buffer for the corresponding sample position. Specifically, the depth buffer is a record of the 'best' depth value (e.g. the one that is closest to the viewer) for each pixel sample of the tile to date. If a received primitive fragment has a 'worse' depth value (e.g. a depth value that indicates it is further from the viewer) than the corresponding depth value in the depth buffer, then the primitive fragment will be hidden by another primitive and so the primitive fragment 'fails' the depth test and is discarded. If, however, the received primitive fragment has a 'better' depth value (e.g. a depth value that indicates it is closer to the viewer) than the corresponding depth value in the depth buffer the primitive fragment 'passes' the depth test. A primitive identifier for the primitive fragment is then stored in a tag buffer and the corresponding value in the depth buffer is updated to indicate there is a new 'best' depth value. The tag buffer stores, for each sample position (i.e. pixel sample) of a tile, a primitive identifier for the primitive fragment which most recently passed a depth test at the sample position. Once the depth test has been performed for all primitive fragments corresponding to the partial display list the depth buffer is stored in memory until the next partial display list for that tile is processed by the HSR logic.

As a result, in such graphics processing systems, the depth buffer for each tile may be read from memory multiple times and written to memory multiple times. Since each read and write consumes a significant amount of bandwidth and time it is desirable to reduce the number of reads and writes of the depth buffers in such graphics processing systems.

Accordingly, described herein are coarse depth test logic and methods for performing a coarse depth test on a set of primitives and/or primitive fragments related to a tile (e.g. the primitives/primitive fragments in a partial display list) prior to performing full resolution hidden surface removal (e.g. the depth test performed by the HSR logic) on those primitives/primitive fragments so as to reduce the number of reads from, and writes to, the depth buffer for that tile. In particular, in the methods and logic described herein a depth range (e.g. minimum and maximum depth values) is maintained for each tile and stored on-chip. Based on the depth range for a tile an initial ("coarse") determination is made as to whether the primitives/primitive fragments in the set are hidden by primitives already processed for that tile (e.g. primitives associated with a previous or earlier partial display list for that tile) and/or the primitives/primitive fragments have a 'better' depth (according to a depth compare mode) than the primitives already processed for that tile.

Specifically, when the coarse depth test logic receives a set of primitives for a tile, the coarse depth test logic determines, from the depth range for that tile, whether each of the primitives (or each of the primitive fragments generated therefrom) would be hidden, at each position in the tile overlapped by the primitive/primitive fragment, by the primitives previously processed for that tile. If it is determined that a primitive/primitive fragment is hidden, then no further processing is performed on that primitive/primitive fragment with respect to that tile (e.g. the primitive/primitive fragment is not processed by the HSR logic with respect to that tile). Accordingly, if it is determined that a primitive/primitive fragment is hidden then that primitive/primitive fragment may not be output from the coarse depth test logic. If, however, it is not determined that a primitive/primitive fragment is hidden, at each position in the tile overlapped by the primitive/primitive fragment, then the coarse depth test logic determines, from the depth range for that tile, whether or not that primitive/primitive fragment has, at each position in the tile overlapped by the primitive/primitive fragment, a 'better' depth than the primitives that have already been processed for that tile. If it is determined that a primitive/primitive fragment has a 'better' depth than the primitives that have already been processed for that tile a read of the depth buffer for that tile is not required to perform full resolution depth testing for that primitive/primitive fragment and the primitive/primitive fragment is identified as such.

Accordingly, in the methods and systems described herein a read of the depth buffer for a tile does not need to be performed to perform a full resolution depth test for a set of primitives for the tile if each of the primitives or primitive fragments in the set is either (i) hidden by the previously processed primitives for that tile; or (ii) has a 'better' depth than the previously processed primitives for that tile according to a depth compare mode. Where each tile is processed multiple times (e.g. via multiple partial display lists) this can significantly reduce the number of depth buffer reads from memory.

In some cases, as described in more detail below, reads of a depth buffer for a tile may be further reduced and/or the number of full resolution depth tests performed for a tile may be reduced by keeping a record of the pixel samples in the tile for which the 'best' depth value will be available to the HSR logic, and comparing the pixel samples that relate to each primitive/primitive fragment to the record to determine if a read of the depth buffer can be omitted and/or a full resolution depth test can be omitted for that primitive/primitive fragment.

While the coarse depth test logic and methods for performing coarse depth testing are described below as being used in a hybrid rendering graphics processing system, the use of the coarse depth test logic and related methods described herein are not limited to use in hybrid rendering graphics processing systems and may be used in other graphics processing systems, such as, but not limited to, other graphics processing systems which render regions of the render space multiple times (e.g. render primitives related to the same region in batches or groups).

Figure 3:
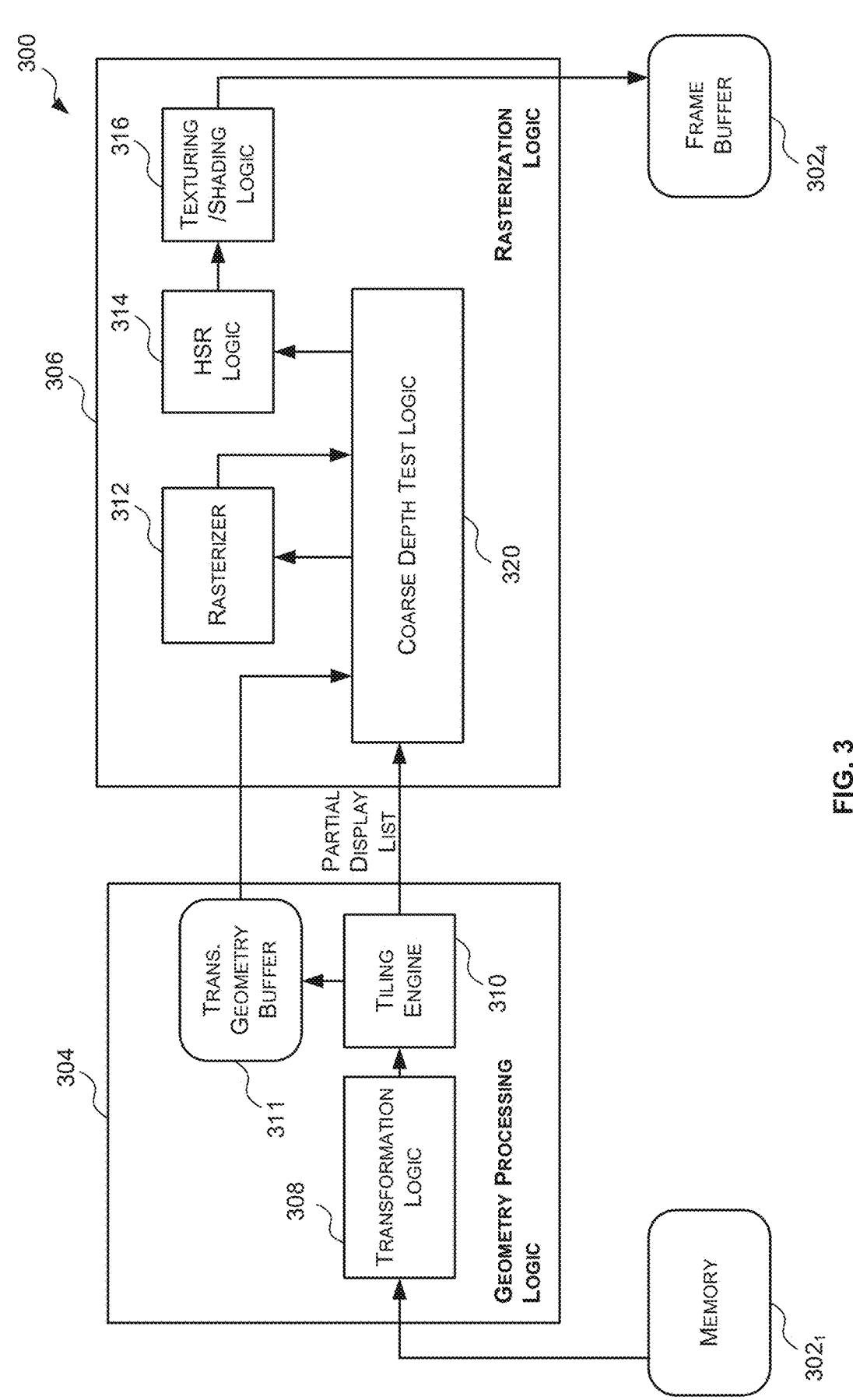
FIG. 3 is a block diagram of an example hybrid rendering graphics processing system with coarse depth test logic.

Reference is now made to FIG. 3 which illustrates an example hybrid rendering graphics processing system 300 which comprises coarse depth test logic 320 that performs a coarse depth test on primitives associated with a tile (e.g. the primitives in a partial display list) based on a depth range associated with that tile prior to full resolution hidden surface removal. Specifically, the hybrid rendering graphics processing system 300 is the same as the hybrid rendering graphics processing system 200 of FIG. 2—it has memory 302₁, 302₄; geometry processing logic 304 that comprises transformation logic 308, a tiling engine 310 and a local transformed geometry buffer 311; and rasterization logic 306 that comprises a rasterizer 312, HSR logic 314 and texturing/shading logic 316 (which generally work in the same manner as the corresponding components in the system 200 described above with respect to FIG. 2)—except it additionally comprises coarse depth test logic 320.

The coarse depth test logic 320 is configured to perform coarse depth testing on each set of primitives/primitive fragments associated with a tile (e.g. the primitives/primitive fragments in a partial display list) prior to full resolution hidden surface removal (i.e. full resolution depth testing). In particular, the coarse depth test logic 320 is configured to store a depth range (e.g. minimum and maximum depth values) for each tile that represents the depth range of the tile based on the primitives that have been previously processed (e.g. previously rendered) for that tile and to perform, for each primitive associated with a tile (or each primitive fragment generated therefrom), a coarse hidden depth test based on the stored depth range for that tile, to determine if the primitive/primitive fragment is hidden by the primitives previously processed for that tile. If the coarse depth test logic determines that a primitive/primitive fragment is hidden in a tile, then no further processing is performed on that primitive/primitive fragment with respect to that tile (e.g. the primitive/primitive fragment is not processed by the HSR logic 314 with respect to that tile). For example, if the coarse depth test logic 320 determines that a primitive is hidden in a tile then that primitive may not be output by the coarse depth test logic 320. If, however, the coarse depth test logic 320 does not determine that a primitive/primitive fragment is hidden by the previously processed primitives for that tile then the coarse depth test logic 320 performs a coarse front depth test based on the depth range for the tile to determine if the primitive/primitive fragment has a 'better' depth than the primitives previously processed for that tile. If it is determined that the primitive/primitive fragment has a 'better' depth than the primitives previously processed for the tile, then the coarse depth test logic 320 provides the primitive/primitive fragment to the HSR logic with an indication or identification that the full resolution depth test can be performed without a read of the depth buffer for that tile.

In one example, the coarse hidden depth test is performed by the coarse depth test logic 320 prior to the rasterizer 312 rasterizing the set of primitives (i.e. prior to converting the primitives into primitive fragments) and the coarse front depth test is performed after the rasterizer 312 has rasterized the set of primitives (i.e. after the primitives have been converted into primitive fragments). An advantage of performing the coarse hidden depth test prior to rasterization is that any primitives that are hidden are culled prior to rasterization thus time and resources are not wasted rasterizing primitives that are hidden. Specifically, rasterizing a primitive into primitive fragments typically comprises determining the depth for each primitive fragment by interpolating the depth of the vertices of the primitive which is quite computation intensive. Therefore culling primitives prior to rasterization can avoid performing this computation intensive processing for primitives that will not be visible in the final frame/image. An advantage of performing the coarse front depth test after rasterization is that, in some cases, a more granular coarse front depth test (e.g. at the primitive fragment/pixel sample level rather than at the primitive level) can be performed with respect to the minimum depth value of the tile. However, it will be evident to a person of skill in the art that this is an example only and that the functions performed by the coarse depth test logic 320 may be split between before and after rasterization (i.e. the conversion of primitives into primitive fragments) in any suitable manner. For example, in other cases both the coarse hidden depth test and coarse front depth test may be performed after rasterization or both the coarse hidden depth test and the coarse front depth test may be performed prior to rasterization. An example implementation of the coarse depth test logic 320 is described in reference to FIG. 4.

In this example, the HSR logic 314 is configured to receive the primitives (or the primitive fragments) that pass the coarse depth test performed by the coarse depth test logic 320 and perform full resolution hidden surface removal on the received primitives/primitive fragments, and when the HSR logic 314 receives a primitive/primitive fragment which has been identified as not requiring a depth buffer read, perform the full resolution hidden surface removal without reading the depth buffer for the corresponding tile.

For example, in some cases the HSR logic 314 may be configured to, when performing hidden surface removal for a set of primitives (or set of primitive fragments) associated with a tile, maintain a depth value update map for that tile and a current best depth value buffer for that tile. The depth value update map indicates which pixel sample depth values have been updated during the processing of the set of primitives/set of primitive fragments, and the current best depth value buffer indicates the 'best' (e.g. smallest) depth value for each pixel sample of the tile to date. When the HSR logic 314 receives the first primitive/primitive fragment in a set associated with a tile the depth value update map for that tile may be initialized to indicate that no depth values have been updated. The current best depth value buffer for that tile may also be initialized at this point. However, the initialization of the current best depth value buffer may differ depending on whether the depth buffer for that tile has been loaded from memory. For example, if the first primitive/primitive fragment in the set was identified as not requiring a depth buffer read then the depth buffer for that tile may not have been read from memory and the values in the current best depth value buffer may be initialized to the 'worst' (e.g. maximum) depth value. If, however, the first primitive/primitive fragment was not identified as not requiring a depth buffer read (i.e. it requires a depth buffer read) then the values in the current best depth value buffer may be initialized to the values in the depth buffer, as read from memory. If one or more pixel sample depth values were updated in the current best depth value buffer prior to a depth buffer read, and then the HSR logic receives a primitive/primitive fragment which triggers a depth buffer read (i.e. a primitive/primitive fragment not identified as not requiring a depth buffer read), then only the depth values in the loaded depth buffer associated with those pixel samples not marked in the depth value update map as having been updated are loaded into the current best depth value buffer. For example, if the depth value associated with pixel sample 1 was updated prior to a depth buffer read then the depth value in the current best depth value buffer associated with sample 1 is not replaced or overwritten with the depth buffer value associated with pixel sample 1.

Performing full resolution hidden surface removal on a primitive/primitive fragment may comprise comparing the depth of the primitive fragment or the depth value of each primitive fragment of the primitive, to the corresponding current 'best' depth value for the pixel sample in the tile associated with the primitive fragment. If the depth value of a primitive fragment is better than the current 'best' depth value, then the primitive fragment passes the full resolution depth test and an identifier of the primitive fragment is sent to the tag buffer. The current best depth value buffer is then updated to reflect the new 'best' depth value for the pixel sample and the depth value update map is updated to reflect that the depth value for that pixel sample has been updated.

If, however, the depth value of a primitive fragment is worse (e.g. higher) than the current 'best' depth value for the corresponding pixel sample then the primitive fragment fails the full resolution depth test and no further processing is performed on that primitive fragment with respect to that tile (e.g. the primitive fragment may not be processed by the texturing/shading logic with respect to that tile).

When the last primitive/primitive fragment in a set associated with a tile is processed by the HSR logic 314, the HSR logic 314 may be configured to write the depth values in the current best depth value buffer, identified in the depth value update map as being updated, to the depth buffer in memory.

Figure 4:
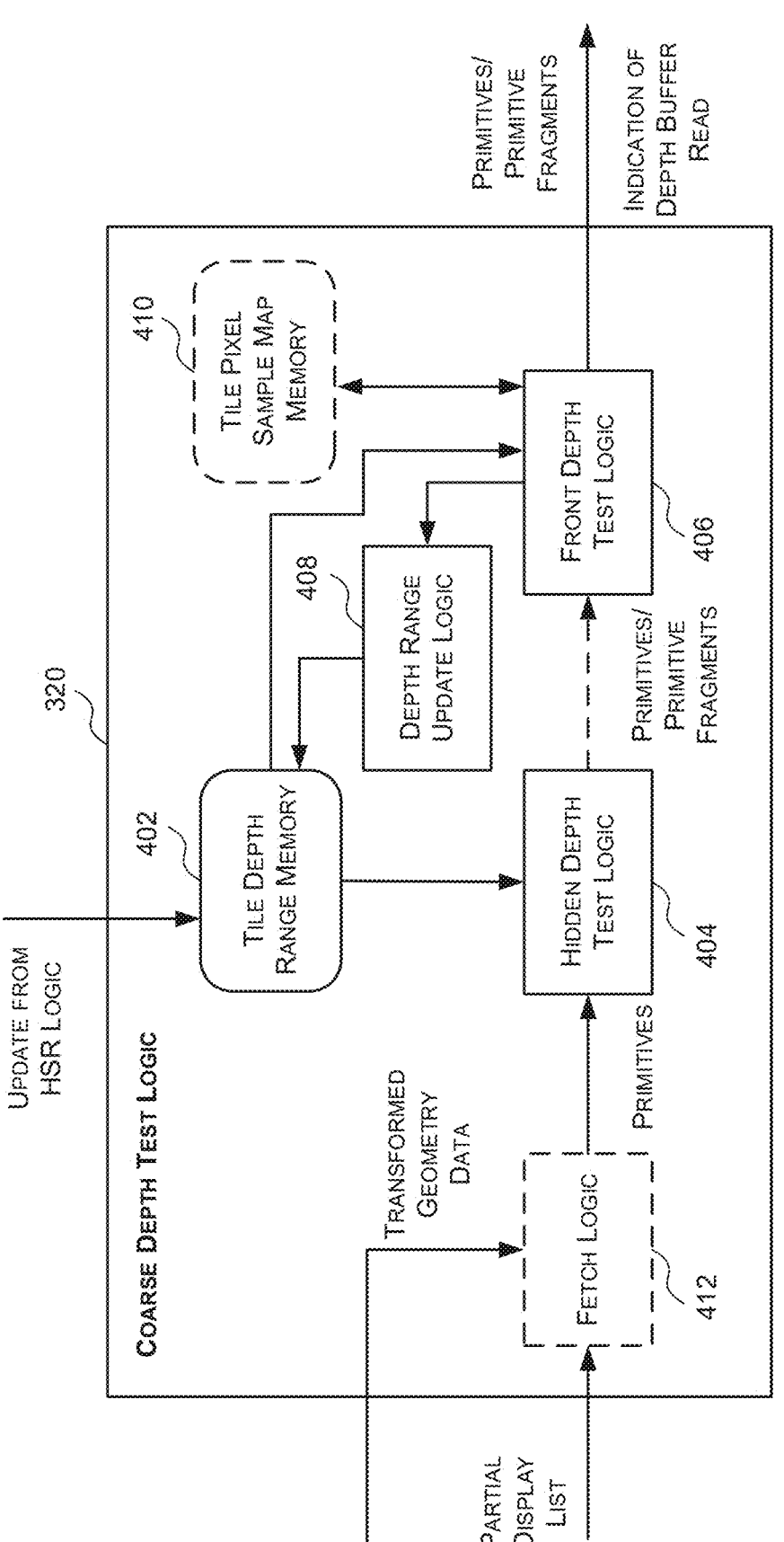
FIG. 4 is a block diagram of an example implementation of the coarse depth test logic of FIG. 3.

Reference is now made to FIG. 4 which illustrates an example implementation of the coarse depth test logic 320 of FIG. 3. In this example, the coarse depth test logic 320 comprises memory 402 for storing the depth range for each tile; hidden depth test logic 404 for determining whether each of the primitives/primitive fragments associated with a tile are hidden by previously processed primitives for that tile; and front depth test logic 406 for determining whether each of the primitives/primitive fragments associated with a tile has a 'better' depth than the previously processed primitives for that tile. The coarse depth test logic 320 may also comprise depth range update logic 408 for updating the depth ranges for the tiles.

The depth range for each tile represents a depth range associated with the primitives previously processed (e.g. previously rendered) for that tile. As described above, the depth buffer for a tile is used to record the 'best' (e.g. lowest) depth value to date for each pixel sample in the tile, wherein the 'best' (e.g. lowest) depth value for a pixel sample is the depth value of the current unhidden or visible primitive fragment at that pixel sample. In some cases, the depth range for a tile may be defined by a minimum depth value and a maximum depth value for the tile, wherein the minimum depth value for the tile is the minimum 'best' depth value for the tile (to date), and the maximum depth value for the tile is the maximum 'best' depth value (to date). In other words, the minimum depth value for the tile is the minimum depth value of the unhidden primitive fragments in the tile based on the primitives previously processed for the tile, and the maximum depth value for the tile is the maximum depth value of the unhidden primitive fragments in the tile based on the primitives previously processed for the tile. In some cases, at the start of each render the maximum and minimum depth values for each tile may be initialised (e.g. by a driver or another component) to the maximum and minimum depth values in the depth buffer for the tile respectively. In other cases, where the maximum and minimum depth values for a tile are not automatically initialised by, for example, a driver the coarse depth test logic 320 may be configured to initialise the maximum and minimum depth values for all the tiles to the 'worst' (e.g. maximum) possible depth value.

The meaning of the minimum and maximum depth values (e.g. whether the minimum or maximum value is closer to the viewer) may depend on the depth compare mode used by the graphics processing system to determine when an object (e.g. primitive/primitive fragment) is in front of another object (e.g. primitive/primitive fragment). Specifically, a graphics processing system can use a variety of different depth compare modes, and may switch between them. Example depth compare modes include, but are not limited to, "less than" (DCM_LESS), "less than or equal to" (DCM_LESS_EQ), "greater than" (DCM_GREATER), "greater than or equal to" (DCM_GREATER_EQ), "equal" (DCM_EQ), "not equal" (DCM_NOT_EQ), "always" (DCM_ALWAYS) or "never" (DCM_NEVER).

The DCM_LESS compare mode is a common depth compare mode because it corresponds to rendering in a coordinate system where the depth value increases with increasing distance from the viewer. A primitive fragment with a depth value less than that of another primitive fragment is closer to the viewer and therefore has a 'better' depth value and is rendered in front of the other primitive fragment. Other depth compare modes support alternative coordinate systems. Depth compare modes are traditionally used for full resolution hidden surface removal in the HSR logic 314, but may also be considered when performing the coarse depth test in the coarse depth test logic 320.

The depth range for each tile may be stored in the memory 402 in any suitable manner. For example, in some cases, the depth ranges for the tiles may be stored in a look-up table or an indexed table which has one entry for each tile. For example, the tiles may be numbered from 0 to n and the depth range (e.g. maximum and minimum depth values) for the $i^{th}$ tile may be stored at, and accessible via, the $i^{th}$ index of the table. In some cases, the coarse depth test logic 320 may comprise a cache (not shown) between the memory 402 storing the depth ranges and the hidden depth test logic 404 and/or the front depth test logic 406 in which the depth ranges for the most recently accessed tiles are stored. This can significantly reduce the number of reads of the memory 402 as there will be many times where both the hidden depth test logic 404 and the front depth test logic 406 will require access to the same depth range information. However, since the memory 402 is implemented "on-chip" as part of the coarse depth test logic 320, reading data from, and writing data to, the memory 402 is not as costly (in terms of power consumption and latency) as reading data from, and writing data to, the off-chip system memory ($302_1$ and $302_4$).

The hidden depth test logic 404 is configured to receive a set of primitives associated with a tile (e.g. the primitives in a partial display list) or a set of primitive fragments associated with a tile (e.g. the primitive fragments generated from the primitives in a partial display list) and perform a coarse hidden depth test on the primitives/primitive fragments based on the depth range for that tile to determine which primitives/primitive fragments in the set are, at every position in the tile overlapped by the primitive/primitive fragment, hidden by primitives previously processed for that tile.

In some cases the hidden depth test logic 404 may be configured to perform the coarse hidden depth test on a per primitive basis. Specifically, in some cases the hidden depth test logic 404 may be configured to determine, for each primitive in a set, whether that primitive is, at all positions in the tile overlapped by that primitive, hidden by the primitives previously processed for the tile (i.e. whether that primitive is hidden in the tile). In these cases, the hidden depth test logic 404 may be configured to determine whether a primitive is, at all positions in the tile overlapped by that primitive, hidden by the primitives previously processed for the tile by comparing the maximum and/or minimum depth of the primitive in the tile to the depth range for the tile.

Figure 5:
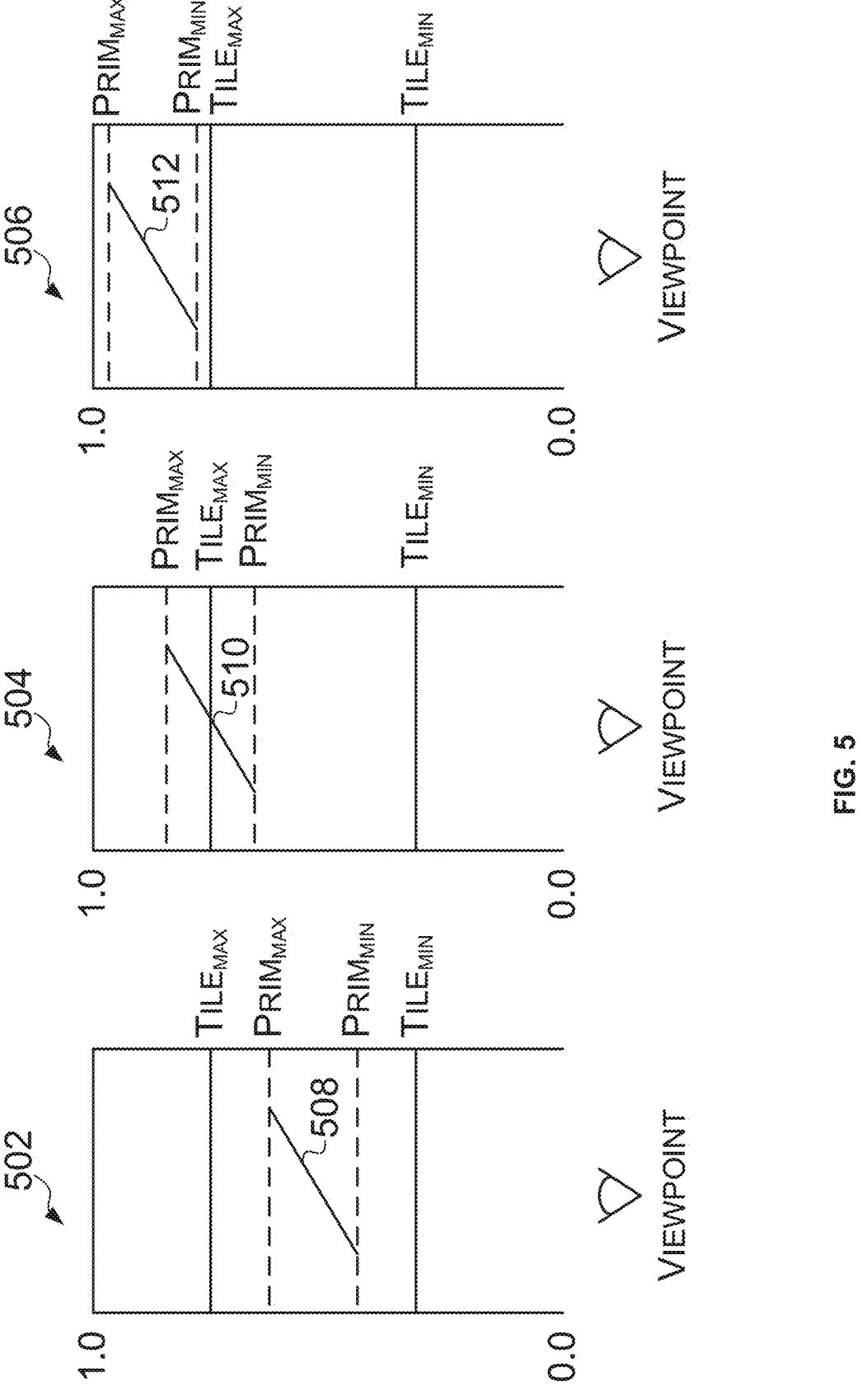
FIG. 5 is a schematic diagram illustrating an example coarse hidden depth test based on a depth range for a tile.

For example, when the coarse depth test logic 320 is operating in DCM_LESS mode, it can only be determined with certainty that at every position in a tile overlapped by a primitive, the primitive is hidden if the minimum depth value of the primitive in the tile ($prim_{min}$) is greater than the maximum depth value of the tile ($tile_{max}$) (i.e. $prim_{min} > tile_{max}$). This is illustrated in FIG. 5 via three examples 502, 504, 506 where the range of possible depth values extends from 0.0 to 1.0 wherein 0.0 is closest to the viewer and 1.0 is furthest from the viewer. In each example

502, 504, 506 the depth of an example primitive 508, 510 and 512 in a tile ($\text{prim}_{max}$, $\text{prim}_{min}$) is shown in comparison to the depth range of the tile ($\text{tile}_{max}$, $\text{tile}_{min}$). In the first example 502 the primitive 508 has a depth range from $\text{prim}_{min}$ to $\text{prim}_{max}$ that falls within the tile depth range defined by $\text{tile}_{min}$ and $\text{tile}_{max}$. In this example it cannot be known that the primitive 508 is hidden at all positions in the tile without comparing the depth of the primitive at each relevant position to corresponding depths in the depth buffer thus it cannot be determined with certainty in the coarse depth test logic 320 that the primitive is hidden.

In the second example 504 the primitive 510 has a depth range from $\text{prim}_{min}$ to $\text{prim}_{max}$ that falls partially within the tile depth range and partially deeper than the tile depth range. In this example, the primitive will be hidden at some positions, but it cannot be determined with certainty in the coarse depth test logic 320 that the primitive is hidden at all positions.

In the third example 506 the primitive 512 has a depth range from $\text{prim}_{min}$ to $\text{prim}_{max}$ wherein the whole range is greater than the maximum depth for the tile (i.e. $\text{prim}_{min}>\text{tile}_{max}$). This means that at each position of the tile overlapped by the primitive there is a primitive that has been previously processed for this position of this tile that has a 'better' depth value (e.g. a smaller depth value when the depth compare mode is DCM_LESS). Therefore the primitive will not be unhidden at any position in the tile (i.e. at every position in the tile overlapped by the primitive, the primitive will be hidden).

Any suitable method may be used to determine the maximum and/or minimum depth of a primitive in a tile. Example methods for determining the maximum and/or minimum depth of a primitive in a tile are described below. For example, when the primitive falls completely within the bounds of the tile and the coarse hidden depth test is performed prior to rasterization the maximum and minimum depths of the vertices of the primitive may be used as the maximum and minimum depths of the primitive. Where, however, the primitive does not fall completely within the bounds of the tile, and the coarse hidden depth test is performed prior to rasterization, the maximum or minimum depth of the primitive in the tile may be estimated as the maximum or minimum of: the depth at any intersection of an edge of the primitive with an edge of the tile; the depth of the primitive at any position of a corner of the tile that falls within the primitive; and the depth of any vertex of the primitive that falls within the tile (see, for example, FIG. 16).

If the hidden depth test logic 404 determines that a primitive is hidden in a tile, then the primitive is not further processed for that tile (e.g. full resolution depth testing is not performed on that primitive for that tile). If, however, the hidden depth test logic 404 has not determined that a primitive is, at all position in the tile overlapped by the primitive, hidden, then the hidden depth test logic 404 outputs the primitive for further processing. In some cases (as shown in FIG. 3, for example), the hidden depth test logic 404 may be configured to output the primitives that pass the coarse hidden depth test to a rasterizer 312 which generates primitive fragments from those primitives and the primitive fragments are then provided to the front depth test logic 406. However, in other cases, the hidden depth test logic 404 may be configured to provide the primitives that pass the coarse hidden depth test directly to the front depth test logic 406.

In some cases, instead of performing the hidden depth test on a per primitive basis the hidden depth test may be performed on per primitive fragment basis. For example, in some cases the primitives may be converted (i.e. rasterized) into primitive fragments (e.g. by the rasterizer 312) before they are provided to the hidden depth test logic 404 such that the hidden depth test logic 404 receives a set of primitive fragments related to a tile. Then for each primitive fragment in the set, the coarse hidden depth test logic 404 may be configured to determine whether that primitive fragment is hidden in the tile by the previously processed primitives for the tile. When DCM_LESS mode is implemented a primitive fragment may be determined to be hidden in a tile by the previously processed primitives for that tile if the depth value of the primitive fragment is greater than the maximum depth value for the tile as defined by the depth range for the tile. If it is determined that a primitive fragment is hidden in a tile, then no further processing may be performed on that primitive fragment with respect to that tile (e.g. a full resolution depth test may not be performed on that primitive fragment). If, however, it is determined that a primitive fragment is not hidden in the tile then that primitive fragment may be output to the front depth test logic 406.

The front depth test logic 406 is configured to perform a coarse front depth test on the primitives/primitive fragments received (directly or indirectly) from the hidden depth test logic 404 based on the depth range for the tile. Specifically, the front depth test logic 406 is configured determine, from the depth range for the tile, whether the primitives/primitive fragments in a set have a 'better' depth (according to a depth compare mode) than the primitives previously processed for that tile.

In some cases the front depth test logic 406 may be configured to perform the coarse front depth test on a per primitive basis wherein a primitive has a 'better' depth than the primitives previously processed for that tile if, at all positions in the tile overlapped by the primitive, the primitive has a 'better' depth then the primitives previously processed for the tile. In these cases, the front depth test logic 406 may be configured to determine whether a primitive has a 'better' depth than the primitives previously processed for that tile by comparing the maximum and/or minimum depth of the primitive in the tile to the depth range for the tile.

Figure 6:
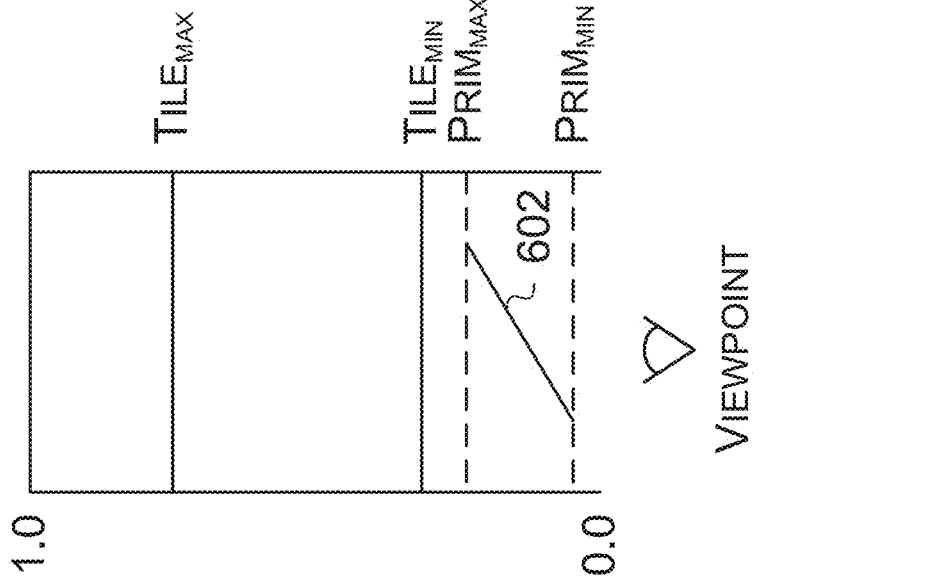
FIG. 6 is a schematic diagram illustrating an example coarse front depth test based on a depth range for a tile.

For example, when the coarse depth test logic 320 is operating in DCM_LESS mode, it can only be determined definitively that at every position in a tile that is overlapped by a primitive, the primitive has a 'better' depth than the previously processed primitives, if the maximum depth value of the primitive in the tile ($\text{prim}_{max}$) is less than the minimum depth of the tile ($\text{tile}_{min}$) (i.e. $\text{prim}_{max}<\text{tile}_{min}$). This is illustrated in FIG. 6 where the range of possible depth values extends from 0.0 to 1.0 and 0 is closer to the viewer and 1.0 is further away from the viewer. In this example the primitive 602 has a depth range from $\text{prim}_{min}$ to $\text{prim}_{max}$ wherein the whole depth range of the primitive is less than the minimum depth for the tile (i.e. $\text{prim}_{max}<\text{tile}_{min}$). This means that at each position of the tile that is overlapped by the primitive the primitive has a 'better' depth value than all of the previously processed primitives for that tile. Therefore the primitive 602 will be in front of the previously processed primitives for that tile at the sample positions that are overlapped by the primitive. Such a primitive may be referred to herein as an 'in front' primitive.

If the front depth test logic 406 has determined that a primitive has 'better' (e.g. smaller) depth than the previously processed primitives for that tile, then the front depth test logic 406 identifies that primitive as one for which the full resolution depth test (e.g. performed by the HSR logic) may be performed for this primitive with respect to that tile without reading in the depth buffer. Such a primitive may also be referred to as a 'no depth buffer read' primitive. This is because, if the primitive has better (e.g. smaller) depth than the primitives previously processed for the tile then either (i) the primitive has the 'best' depth value at all relevant pixel samples and thus its depth value at each relevant pixel sample will become the new 'best' depth for those pixel samples; or (ii) one or more primitives that precede that primitive in the set will have a depth value that is better than that primitive's depth value at one or more pixel samples. In the second case the depth values of the primitive then only need to be compared against the depth values of the earlier primitive(s) in the set. In either case then the 'best' depth values for those pixel samples will come from the primitives in the set currently being processed. Accordingly, if the front depth test logic 406 has determined that a primitive has better (e.g. smaller) depth than all of the previously processed primitives for that tile then the front depth test logic 406 may output the primitive along with an indication that the depth buffer does not have to be read. The indication may take any suitable form. For example, in some cases, the indication may be in the form of a flag that is set when the depth buffer does not have to be read. However, this is an example only and the indication may take other forms. Where the coarse front depth test is performed after rasterization then each primitive fragment in the tile related to the primitive may be identified as a 'no depth buffer read' primitive fragment.

Performing the coarse front depth test to identify primitives for which the depth buffer does not have to be read can significantly reduce the number of depth buffer reads. For example, if all of the primitives in the set of primitives received by the hidden depth test logic 404 are either culled because they are hidden, or are identified as not requiring a depth buffer read because they have a 'better' depth than the previously processed primitives for the tile, then when that set of primitives (or the primitive fragments related thereto) is subsequently processed by the HSR logic the depth buffer for the corresponding tile does not have to be read.

In some cases, the front depth test logic 406 may be configured to further reduce the number of depth buffer reads by keeping a record (e.g. in memory 410) of the pixel samples in the tile for which it is known that the HSR logic will have the 'best' depth value, and for any 'not in front' primitive in the set comparing the pixel samples related to that primitive to the record to determine if a read of the depth buffer is required for that primitive. Specifically, if the HSR logic already has the 'best' depth value (to date) for all of the pixel samples in the tile associated with a 'not in front' primitive then a read of the depth buffer is not required for the full resolution depth test for the 'not in front' primitive.

Figure 7:
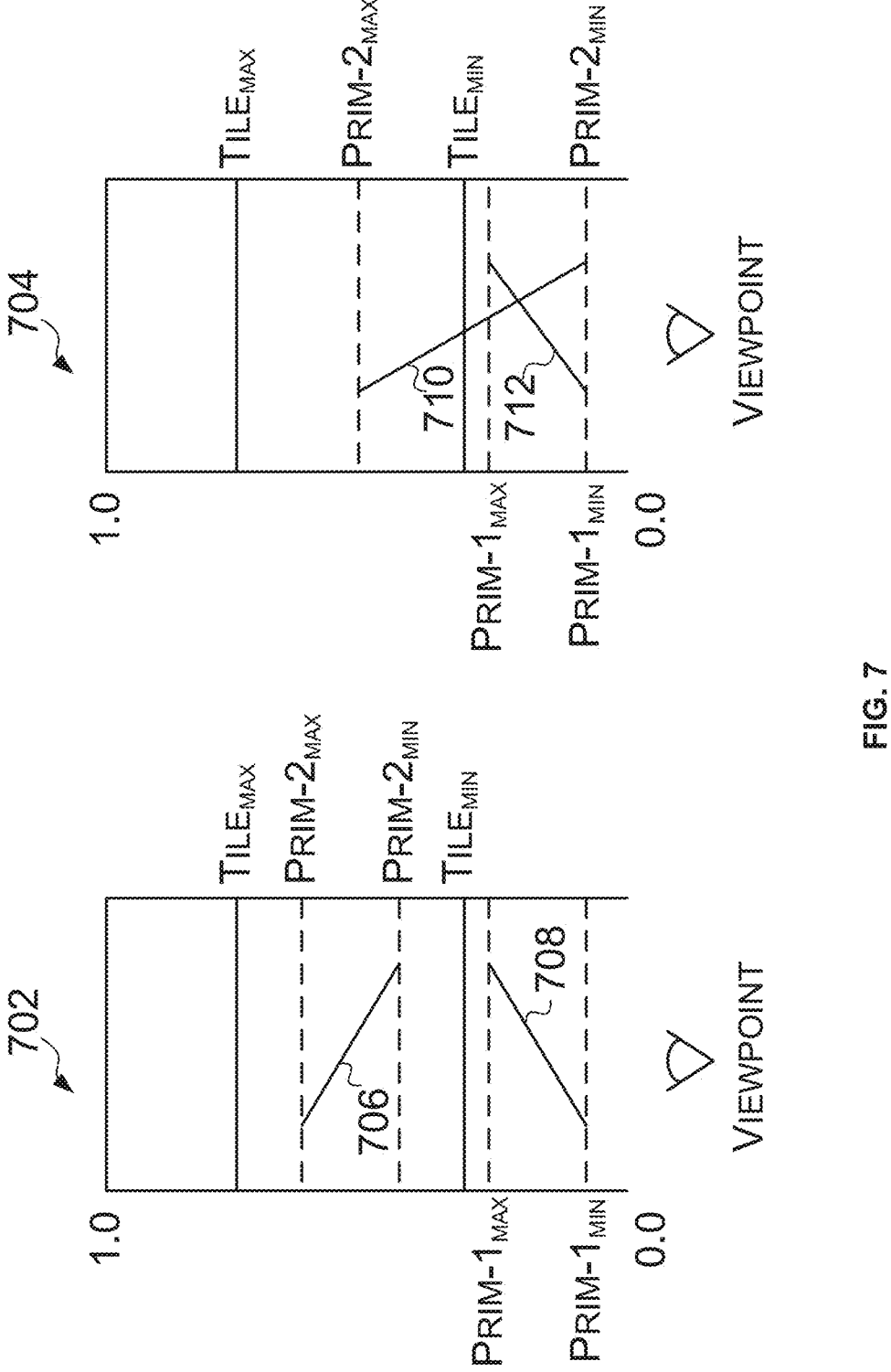
FIG. 7 is a schematic diagram illustrating the relationship between an 'in front' primitive and a 'not in front' primitive.

In some cases, the front depth test logic 406 may be configured to, in response to identifying an 'in front primitive', update the record to indicate that the HSR logic will have the 'best' depth value to date for all of the pixel samples associated with that 'in front primitive'. A read of the depth buffer is not required for the full resolution depth test of a 'not in front' primitive if all of the pixel samples associated with that 'not in-front' primitive are related to an early 'in front' primitive because the best depth value to date for those pixel samples will either come from the 'in front' primitive(s) preceding the primitive in the set or the 'not in front' primitive. Specifically, in these cases there are two scenarios that can occur: The first scenario, shown at 702 in FIG. 7, is when the 'not in front' primitive 706 falls completely behind the 'in front' primitive(s) 708 that have preceded it in the set of primitives; and the second scenario, shown at 704, is when the 'not in front' primitive 710 falls partially behind the 'in front' primitive(s) 712 and partially in front of the 'in front' primitive(s) 712. In either scenario the 'best' depth values come from the 'not in front' primitive 706, 710 or the 'in front' primitives 708, 712 in the set that have preceded that 'not in front' primitive. Accordingly, in these cases (where all of the pixel samples in the tile associated with the 'not in front' primitive (primitive 706 or 710) are also associated with the 'in front' primitive (primitive 708 and 712)), a read of the depth buffer is not necessary to identify the 'best' depth value to date for those pixel samples. Therefore, if it is determined that the HSR logic will have the 'best' depth value for all of the pixel samples associated with a 'not in front' primitive then the 'not in front' primitive may be output to the next stage (e.g. the HSR logic) with an indication that the full resolution depth test can be performed without a read of the depth buffer.

Figure 8:
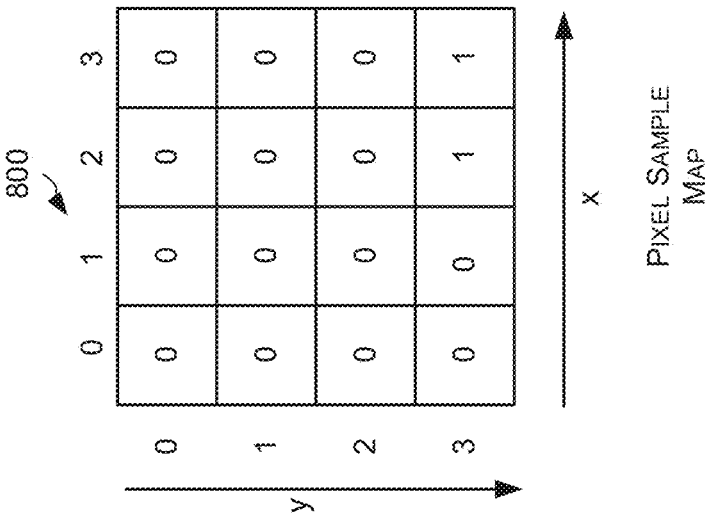
FIG. 8 is a schematic diagram illustrating an example pixel sample map.
Figure 8:
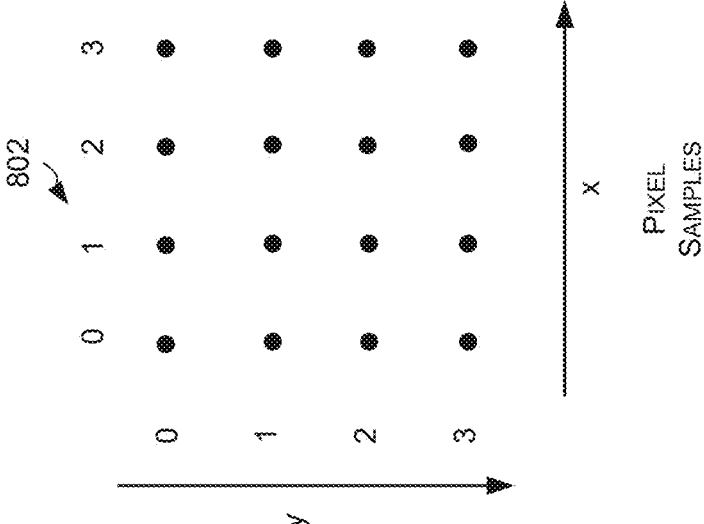

In some cases, the front depth test logic 406 may be configured to implement this by maintaining a pixel sample map 800, as shown in FIG. 8, for the tile currently being processed that indicates which pixel samples of that tile the HSR logic will have the 'best' depth value to date. In the example shown in FIG. 8 the pixel sample map 800 is for a 4×4 tile of pixel samples 802 and there is a bit for each pixel sample that indicates whether or not the HSR logic will have the 'best' depth value for that pixel sample. In this example a '0' indicates that the HSR logic may not have the 'best' (e.g. lowest) depth value to date for that pixel sample and a '1' indicates that the HSR logic will have the 'best' (e.g. lowest) depth value to date for that pixel, however, it will be evident to a person of skill in the art that this is an example only. Accordingly, in this example, the HSR logic has the 'best' (e.g. lowest) depth value for only pixel samples (3, 2) and (3,3).

Figure 9:
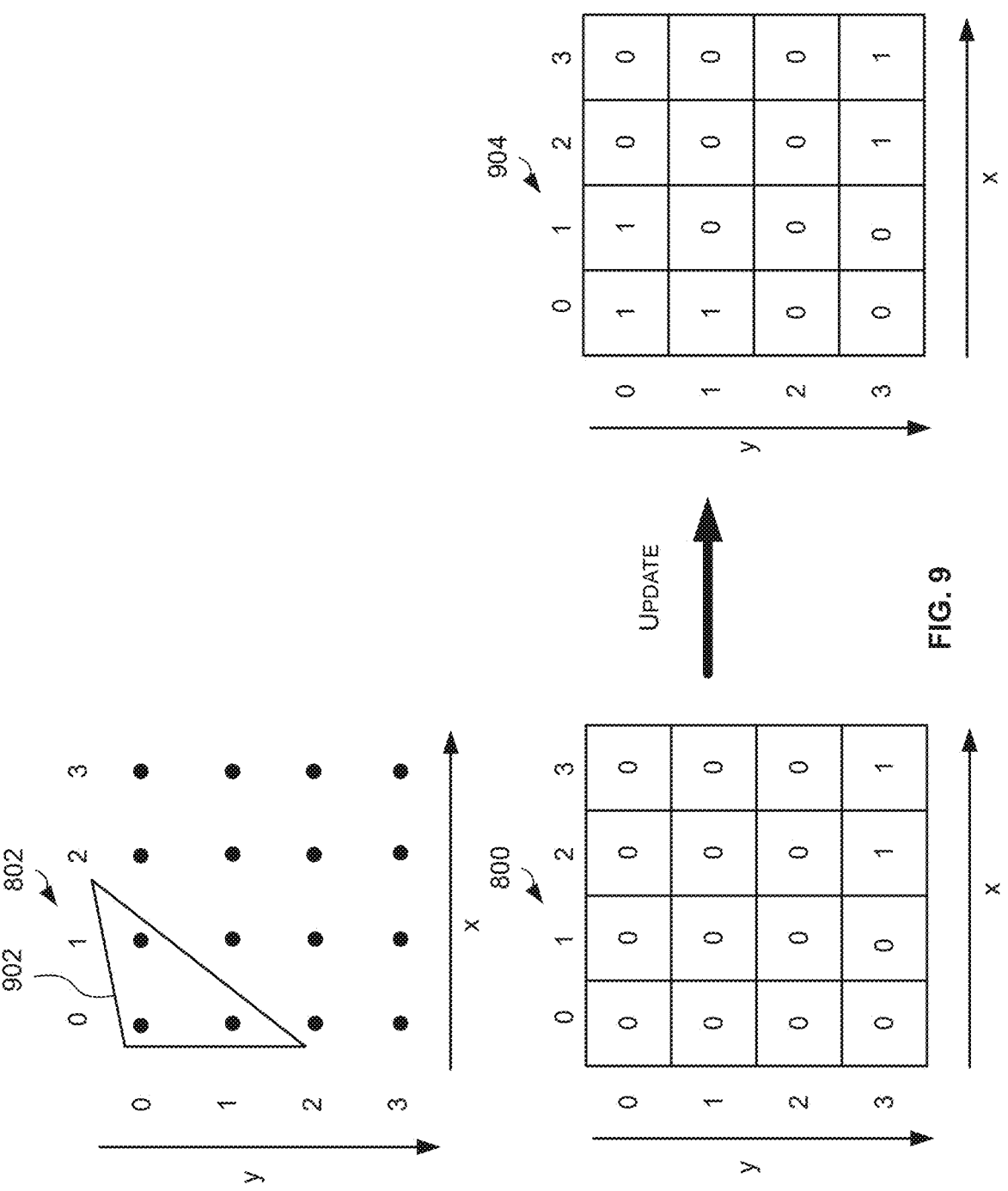
FIG. 9 is a schematic diagram illustrating updating an example pixel sample map in response to an example 'in front' primitive.

The front depth test logic 406 may be configured to, in response to determining that a primitive has a 'better' depth (according to a depth compare mode) than the primitives previously processed for the tile (i.e. the primitive is an 'in front' primitive), identify the pixel samples associated with that 'in front' primitive. A pixel sample may be associated with a primitive if that primitive overlaps with the position of that pixel sample. A comparison is then made between the identified pixel samples and the pixel sample map 800. If the pixel sample map 800 indicates that any of the pixel samples identified as being associated with the 'in front' primitive are not marked in the pixel sample map the front depth test logic 406 updates the pixel sample map to indicate that the HSR logic will have the 'best' depth value for those pixel samples. For example, if as shown in FIG. 9 an 'in front' primitive 902 is received which is associated with pixel samples (0,0), (0,1) and (1,0) and pixel samples (0,0), (0,1) and (1,0) are not currently marked in the pixel sample map 800 then the pixel sample map 800 map is updated to indicate that the HSR logic will have the 'best' depth values for pixel samples (0,0), (0,1) and (1,0) to generate an updated pixel sample map 904.

The pixel sample(s) of a tile that a primitive is associated with may be determined in any suitable manner. For example, where the front depth test logic 406 is configured to receive primitives after they have been rasterized (i.e. after the primitives have been converted into primitive fragments) then the pixel samples to which the primitives relates may be based on the primitive fragments for that primitive. For example, rasterizing a primitive converts the primitive into one or more primitive fragments each of which corresponds to a particular pixel sample. In these cases, the front depth test logic 406 may be configured to determine that a primitive is associated with a particular pixel sample if there is a primitive fragment for that primitive that corresponds to that pixel sample.

Figure 10:
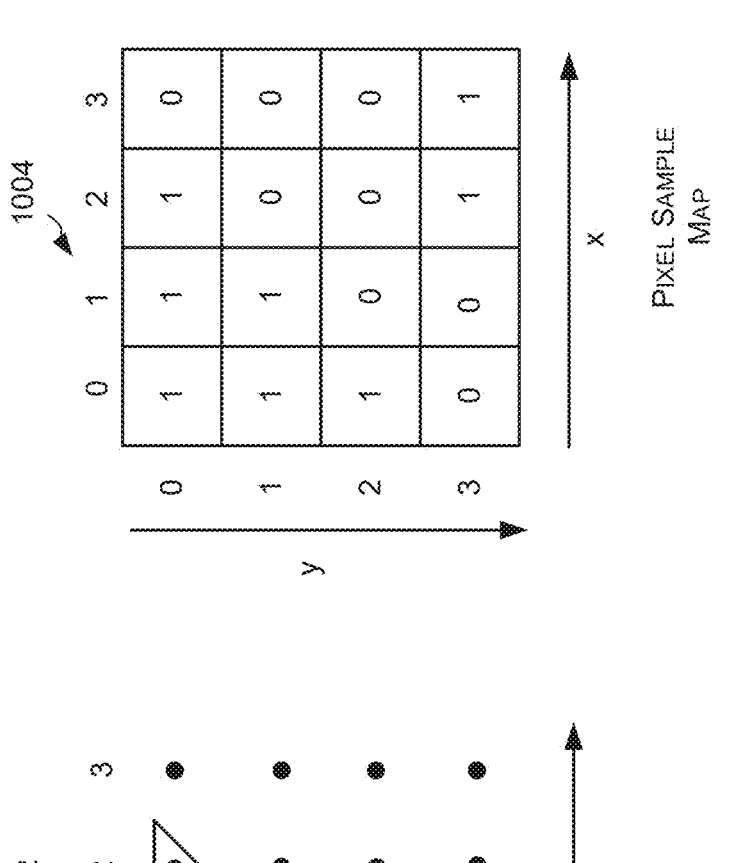
FIG. 10 is a schematic diagram illustrating determining whether to perform a depth buffer read for a first example 'not in front' primitive based on an example pixel sample map.
Figure 11:
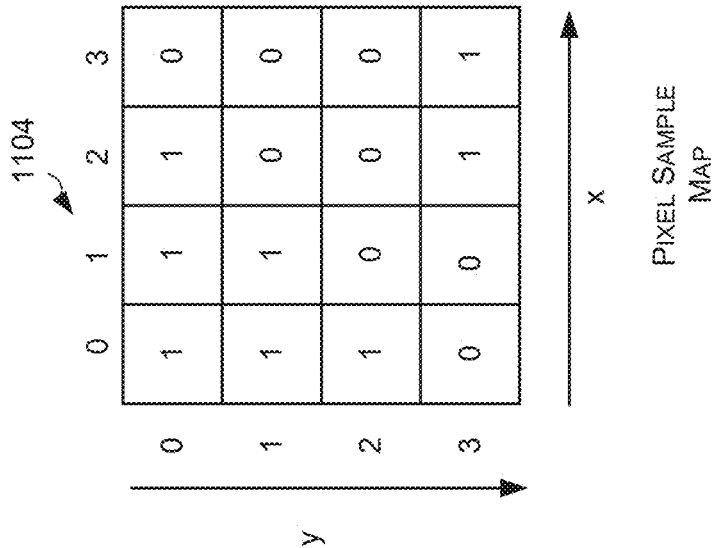
FIG. 11 is a schematic diagram illustrating determining whether to perform a depth buffer read for a second example 'not in front' primitive based on an example pixel map.
Figure 11:
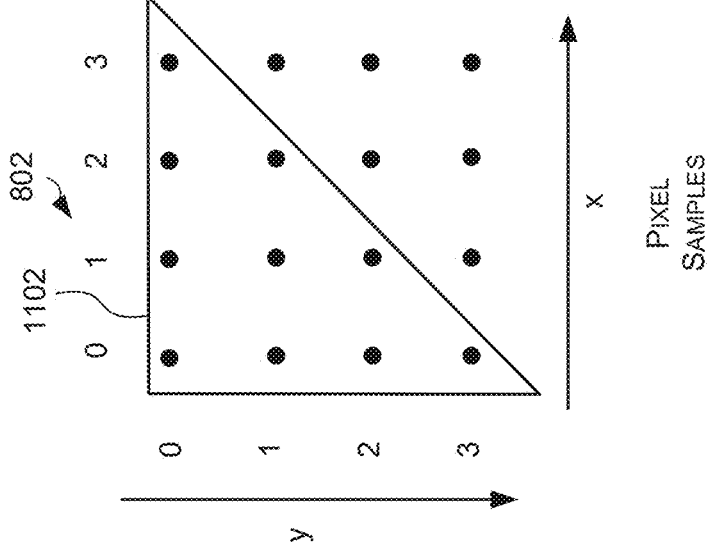

The front depth test logic 406 may then be further configured to, in response to determining that a primitive is a 'not in front' primitive, identify the pixel samples in the tile associated with that 'not in front' primitive. A comparison is then made between the identified pixel samples and the pixel sample map. If the pixel sample map indicates that the HSR logic has the 'best' depth value (to date) for all of the pixel samples associated with the 'not in front' primitive the front depth test logic 406 identifies the primitive as a 'no depth buffer read' primitive. For example, if as shown in FIG. 10 a 'not in front' primitive 1002 is received that is associated with pixel samples (0,0), (0,1), (0,2), (1,0), (1,1) and (2,0) and the pixel sample map 1004 indicates that the HSR logic will have the 'best' depth values for all of those pixel samples then a read of the depth buffer for that tile is not required. If, however, as shown in FIG. 11 a 'not in front' primitive 1102 is received that is associated with pixel samples (0,0), (0,1), (0,2), (0,3), (1,0), (1,1), (1,3), (2,0), (2,1) and (3,0) but the pixel sample map 1104 does not indicate that the HSR logic will have the 'best' depth value for pixel samples (0,3), (1,2), (2,1) and (3,0) then a read of the depth buffer may be required.

In some cases, the front depth test logic 406 may be further configured to, upon identifying a primitive that requires a depth buffer read (e.g. a 'not in front' primitive wherein the pixel sample map indicates that the HSR logic does not have the 'best' depth value for at least one of the pixel samples associated with the 'not in front' primitive), update the record (e.g. pixel sample map) to indicate that the HSR logic has the 'best' depth value for all of the pixel samples so that all subsequent primitives will be identified as 'no depth buffer' read primitives. This is because a primitive that requires a depth buffer read will trigger a read of the depth buffer for the tile meaning that after processing that primitive the HSR logic will have the 'best' depth values for all of the pixel samples. Therefore even if a subsequent primitive requires the information in the depth buffer to perform full resolution depth testing on that primitive that depth buffer information will already be available.

In some cases, once the front depth test logic 406 has identified a primitive in a set of primitives for a tile that requires a depth buffer read, the front depth test logic 406 may not perform coarse front depth testing on the subsequent primitives in the set. This is because once one primitive in the set has been identified as requiring a depth buffer read that primitive will trigger a depth buffer read therefore a depth buffer read cannot be avoided for that set of primitives regardless of whether the subsequent primitives require a depth buffer read. Therefore time and resources can be saved by not performing unnecessary coarse front depth testing.

Where the front depth test logic 406 is configured to keep a record (e.g. pixel sample map) of the pixel samples in the tile for which the HSR logic will have the 'best' depth value (to date) and the record (e.g. pixel sample map) is updated after each 'in front' primitive and after a primitive requiring a depth buffer read, the front depth test logic 406 may additionally, or alternatively use that record (e.g. pixel sample map) to determine whether the full resolution depth test can be skipped for 'in front' primitives.

Specifically, in some cases, in response to identifying a primitive as an 'in front' primitive, the front depth test logic 406 may be configured to identify the pixel samples associated with the 'in front' primitive. A comparison is then made between the identified pixel samples and the pixel sample map. If the pixel sample map indicates that the HSR logic will not have the 'best' 'depth value (to date) for any of the pixel samples associated with the primitive (i.e. this is the first 'in front' primitive that relates to these pixel samples and the 'in front' primitive is not preceded in the set by a primitive that requires a depth buffer read) then there is no need to perform a full resolution depth test because the depth values of this primitive will be the 'best' values to date and thus the depth values of that primitive in the tile can be simply recorded as the 'best' depth values to date for the corresponding pixel samples.

If, however, the pixel sample map indicates that the HSR logic will have the 'best' depth value (to date) for at least one of the pixel samples associated with the 'in front' primitive (i.e. the pixel sample is related to an earlier 'in front' primitive in the set, or the primitive was preceded in the set by a primitive that required a depth buffer read), then a full resolution depth test may need to be performed for these pixel samples. In these cases, if the front depth test logic 406 determines that an 'in front' primitive does not require a full resolution depth test the 'in front' primitive may be output with an indication that a full resolution depth test is not required. The indication may take any suitable form. For example, in some cases the indication may be a flag which may be set when a full resolution depth test is required and not set, otherwise.

Identifying primitives for which a full resolution depth test is not required may save time and resources reading depth values from the depth buffer and performing unnecessary full resolution depth tests.

Where the coarse front depth test is performed after rasterization (i.e. after the primitives have been converted into primitive fragments) the depth buffer read and/or full resolution depth test determinations may be made on a per primitive fragment basis instead of a per primitive basis. For example, in some cases, instead of the front depth test logic 406 being configured to determine whether each primitive in a set of primitives related to a tile has a better depth than the previously processed primitives for the tile, the front depth test logic 406 may be configured to determine whether each primitive fragment in a set of primitive fragments related to a tile (e.g. the set of primitive fragments that correspond to the primitives identified in a partial display list) has a better depth value than the previously processed primitives for the tile.

In these cases, the front depth test logic 406 may be configured to determine whether a primitive fragment has a 'better' depth than the primitives previously processed for that tile by comparing the depth of the primitive fragment to the depth range for the tile. For example, when the coarse depth test logic 320 is operating in DCM_LESS mode, it may be determined that a primitive fragment has a 'better' depth value than the previously processed primitives for that tile if the depth of that primitive fragment (e.g. Z value or Z co-ordinate) is less than the minimum depth of the tile. If the front depth test logic 406 determines that a primitive fragment has a 'better' (e.g. smaller) depth than the previously processed primitives for that tile, then (for the reasons set out above) the front depth test logic 406 may identify that primitive fragment as one for which the full resolution depth test (e.g. performed by the HSR logic) may be performed for this primitive fragment without reading in the depth buffer for that tile. Such a primitive fragment may be referred to herein as an 'in front' primitive fragment. A primitive fragment that does not have a 'better' depth than the primitives previously processed for the tile may be referred to herein as a 'not in front' primitive fragment.

In these cases, the front depth test logic 406 may be configured to keep a record (e.g. pixel sample map) of the pixel samples in the tile for which the HSR logic will have the 'best' depth value (to date). The front depth test logic 406 may be configured to update the record after identifying an 'in front' primitive fragment to indicate that the HSR logic will have the 'best' depth value for the pixel sample associated with the 'in front' primitive fragment. The front depth test logic 406 may also be configured to update the record after identifying a 'depth buffer read' primitive fragment to indicate that the HSR logic will have the 'best' depth value for each pixel sample in the tile. The front depth test logic 406 may then be configured to, in response to identifying a 'not in front' primitive fragment, determine whether a depth buffer read can be avoided for the 'not in front' primitive fragment based on the record. For example, the front depth test logic 406 may be configured to determine that a 'depth buffer' read is not required for a 'not in front' primitive fragment if the record (e.g. pixel sample map) indicates that the HSR logic will have the 'best' depth value for the pixel sample associated with that primitive fragment. If the front depth test logic 406 determines, from the record, that a 'not in front' primitive fragment does not require a depth buffer read then that 'not in front' primitive fragment may be identified as a 'no depth buffer read' primitive fragment. If, however, the record does not indicate that the HSR logic will have the best depth value for a 'not in front' primitive fragment then the front depth test logic 406 may be configured to identify the 'not in front' primitive fragment as a 'depth buffer read' primitive fragment.

Where the front depth test logic 406 is configured to keep a record (e.g. pixel sample map) of the pixel samples in the tile for which the HSR logic will have the 'best' depth value (to date), the record may be used to determine whether a full resolution depth test needs to be performed for an 'in front' primitive fragment. For example, in some cases if the record indicates that the HSR logic does not have the 'best' depth value for the pixel sample associated with an 'in front' primitive fragment then the 'in front' primitive fragment may be identified as a 'no depth buffer test' primitive fragment.

The depth range update logic 408 is configured to update the depth ranges for the tiles as primitives/primitive fragments related to the tiles are processed. In some cases, the depth range update logic 408 may be configured to update the depth range for a tile after a set of primitives/primitive fragments related to a tile have been completely processed by the coarse depth test logic 320. For example, in some cases, the depth range update logic 408 may be configured to keep track of a current 'best' depth value for the tile that is currently being processed and when the coarse depth test logic 320 has completed processing of the set of primitives/primitive fragments associated with that tile (i.e. has performed coarse hidden depth testing and coarse front depth testing on each primitive/primitive fragment in the set) then the depth range update logic 408 may be configured to update the memory 402 with the current 'best' depth value.

For example, in some cases, when the front depth test logic 406 identifies an 'in front' primitive or an 'in front' primitive fragment from the set of primitives, the front depth test logic 406 may provide the depth range update logic 408 with the 'best' depth value for that 'in front' primitive or 'in front' primitive fragment (e.g. where the DCM_LESS depth test mode is used the 'best' depth value is the lowest or minimum depth value). The depth range update logic 408 may then determine if it has already received a 'best' depth value from the front depth test logic 406 for the tile. If the depth range update logic 408 has not received a 'best' depth value from the front depth test logic 406 for this tile then depth range update logic 408 may record or store the received depth value as the current 'best' depth value for the tile. If the depth range update logic 408 has already received a 'best' depth value from the front depth test logic 406 for the tile then it may compare the received 'best' depth value to the stored current 'best' depth value for the tile to determine which is better. If the received 'best' depth value is better than the stored current 'best' depth value the stored current 'best' depth value is updated with the received value. For example, where the DCM_LESS depth test mode is used the depth range update logic 408 may determine whether the received depth value is less than the current 'best' depth value and if so, the current 'best' depth value is updated with the received depth value.

When the coarse depth test logic has processed all of the primitives/primitive fragments in the set the depth range update logic 408 may write the current 'best' depth value for the tile to memory 402.

In some cases, the HSR logic may be configured to, once it completes processing a partial display list for a tile (e.g. the primitive fragments associated with the primitives identified in a partial display list) determine whether the HSR logic has the 'best' depth value for all of the pixel samples in that tile (e.g. the current best depth value buffer has a depth value for each pixel sample in the tile). The HSR logic may comprise the 'best' depth value for all the pixel samples in the tile (a) if processing the partial display list has caused a depth value update to each of the pixel samples in the tile; or (b) if a depth buffer read has been performed for that tile. The HSR logic may not comprise the 'best' depth value for all the pixel samples in the tile if a depth buffer read was not performed for that tile and not all the depth values in the tile were updated by processing the partial display list. If the HSR logic determines that it comprises the 'best' depth value for all of the pixel samples in the tile then the HSR logic may identify the 'worst' (e.g. maximum) depth value for the tile and send a message or command to the coarse depth test logic 320 which cause the coarse depth test logic 320 to update the depth range for that tile to reflect the 'worst' (e.g. maximum) depth value for that tile.

In some cases, as shown in FIG. 4, the coarse depth test logic 320 may receive information (e.g. a partial display list) that identifies a set of primitives that fall within the bounds of a tile. In these cases, the coarse depth test logic 320 may also comprise fetch logic 412 which is configured to receive the partial display lists and for each partial display list fetch the corresponding transformed geometry data for the primitives identified therein from memory (e.g. transformed geometry data buffer) and provide the relevant transformed geometry data to the hidden depth test logic 404. However, in other cases, the coarse depth test logic 320 may directly receive the transformed geometry data for a set of primitives/primitive fragments related to a tile.

It is noted that in some cases there may be some primitives for which hidden surface removal is not to be performed by the HSR logic. Examples of such primitives include primitives, such as punch through primitives, for which the visibility of the primitive is shader dependent, and depth feedback primitives which have shader-dependent depth values. In these cases, the coarse depth test logic 320 may be configured to simply pass through any such primitives. In other words if the coarse depth test logic 320 determines a received primitive is one for which hidden surface removal is not to be performed by the HSR logic then the coarse depth test logic 320 may not perform coarse hidden depth testing or coarse front depth testing on that primitive.

Figure 12:
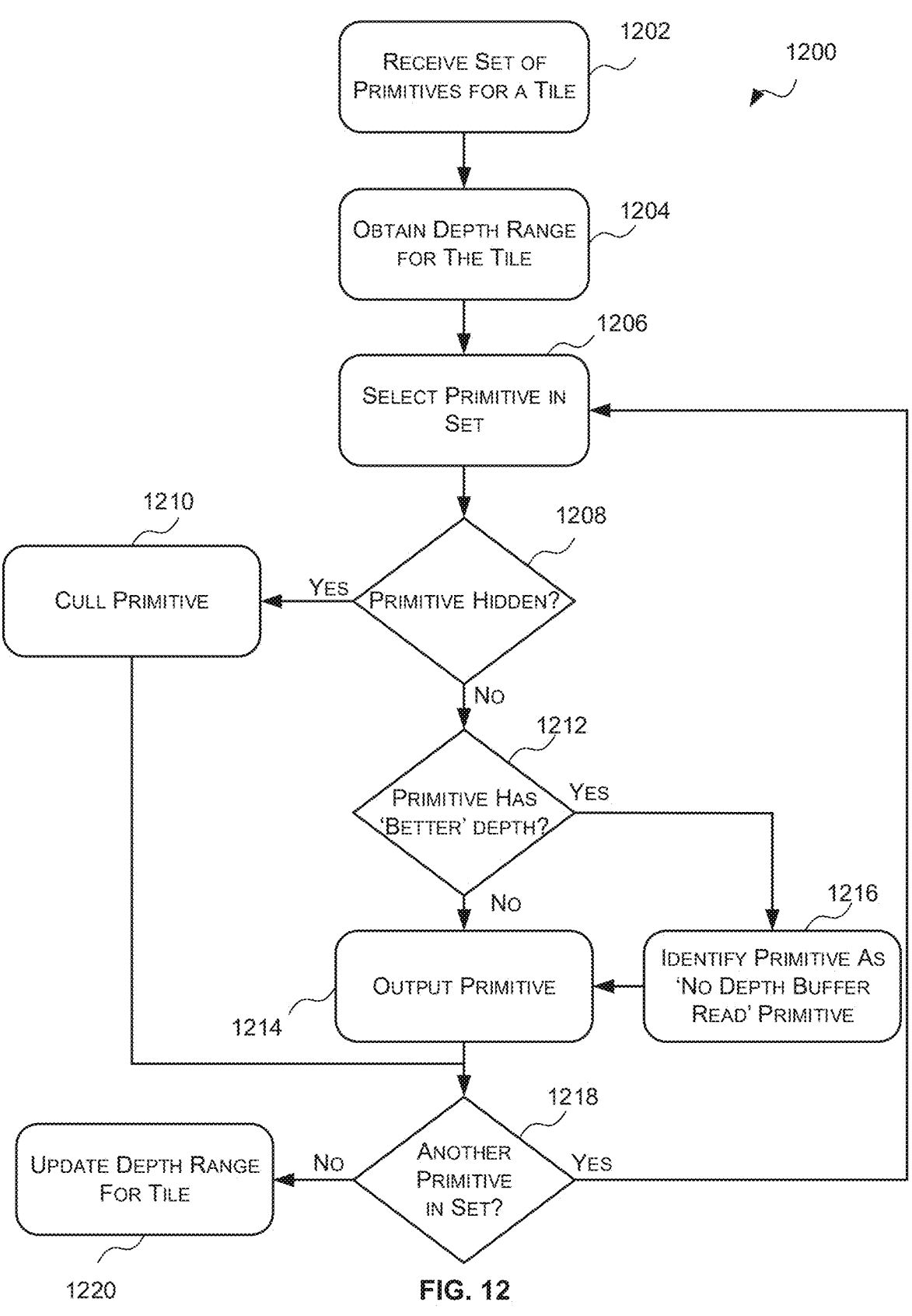
FIG. 12 is a flow diagram of an example method for performing coarse depth testing in a graphics processing system.

Reference is now made to FIG. 12 which illustrates an example method 1200 of performing coarse depth testing of primitives in a graphics processing system prior to performing full resolution depth testing, which may be implemented by the coarse depth test logic 320 of FIG. 4. The method 1200 begins at block 1202 where the coarse depth test logic 320 receives a set of primitives related to a tile. Receiving a primitive may comprise receiving data (e.g. transformed geometry data or primitive fragment data) defining that primitive. A primitive is said to be related to a tile if that primitive falls, or lies, at least partially within the bounds of that tile. The set of primitives may, for example, be a set of primitives in a partial display list. Once the set of primitives has been received the method 1200 proceeds to block 1204.

At block 1204, the depth range for the tile is obtained. As described above, the depth range represents a depth range associated with the tile based on the primitives previously processed for the tile (e.g. the primitives in previous partial display lists for the tile). Specifically, the depth buffer for a tile is used to record the current 'best' (e.g. lowest) depth value for each pixel sample in the tile, wherein the current 'best' (e.g. lowest) depth value for a pixel sample is the depth value of the current unhidden or visible primitive fragment at that pixel sample. The depth range may be defined by a maximum depth value and a minimum depth value wherein the minimum depth value for the tile is the minimum 'best' depth value for the tile (to date), and the maximum depth value for the tile is the maximum 'best' depth value (to date). In other words, the minimum depth value for the tile is the minimum depth value of the unhidden primitive fragments in the tile based on the primitives previously processed for the tile, and the maximum depth value for the tile is the maximum depth value of the unhidden primitive fragments in the tile based on the primitives previously processed for the tile. In some cases, the depth range for each tile may be stored in memory (e.g. memory 402) and obtaining the depth range for the tile may comprise reading the depth range for the relevant tile from the memory. Once the depth range for the tile is obtained the method 1200 proceeds to block 1206.

At block 1206, one of the primitives in the set is selected as the current primitive. In some cases the primitives in the set may be received in a particular order and the primitives may be processed in the order in which they are received. Once one of the primitives in the set has been selected as the current primitive the method 1200 proceeds to block 1208.

At block 1208, a determination is made, based on the depth range for the tile, whether the current primitive is, at all positions in the tile which overlap with the current primitive, hidden by the primitives previously processed for the tile. As described above, the determination may be made by comparing the depth range of the tile to the maximum or minimum depth of the primitive in the tile. For example, where the DCM_LESS depth compare mode is used the primitive may be determined to be hidden in the tile by the primitives previously processed for the tile if the minimum depth of the primitive in the tile is greater than the maximum depth of the tile. The maximum and/or minimum depth of a primitive in the tile may be determined using any suitable method. Example methods for determining the maximum and/or minimum depth of a primitive in a tile, when the determination is made prior to rasterization, are described below. If it is determined that the primitive is hidden, then the method 1200 proceeds to block 1210 where no further processing is performed for the current primitive with respect to the current tile (e.g. full resolution depth testing is not performed for the primitive in respect of the current tile). If, however, it is not determined in block 1208 that the primitive is hidden then the method 1200 proceeds to block 1212.

At block 1212, a determination is made, based on the depth range for the tile, whether, at all locations in the tile which overlap with the current primitive, the current primitive has a 'better' depth than the primitives previously processed for the tile. As described above, the determination may be made by comparing the depth range for the tile to the maximum or minimum depth of the primitive in the tile. For example, where the DCM_LESS depth compare mode is used a primitive may be determined to have a 'better' depth than the primitives previously processed for the tile if the maximum depth of the primitive in the tile is less than the minimum depth of the tile. The maximum and/or minimum depth of a primitive in a tile may be determined using any suitable means. For example, where the 'in front' determination is made after rasterization the maximum or minimum depth of a primitive in a tile may be the maximum or minimum depth respectively of the primitive fragments of that primitive that fall within the tile. If it is not determined that the primitive has a 'better' depth than the primitives previously processed for the tile, then the method 1200 proceeds to block 1214 where the primitive is output for further processing. For example, as described above, the primitive may be provided to the HSR logic for processing. If, however, it is determined at block 1212 that the primitive has, at all locations of the tile which overlap with the current primitive, a 'better' depth than the primitives previously processed for the tile, then the method 1200 proceeds to block 1216.

At block 1216, the primitive is identified as a 'no depth buffer read' primitive. Specifically, as described above, if a primitive has better (e.g. smaller) depth than the previously processed primitives for the tile according to a depth compare mode (e.g. DCM_LESS) then the best depth for the pixel samples that the primitive is associated with will either be the depth values of that primitive or an earlier 'in front' primitive in the set thus the 'best' depth value for those pixel samples can be determined without reading the depth buffer for the tile. The method 1200 then proceeds to block 1214 where the primitive is output for further processing (with the identification).

After block 1214, the method 1200 proceeds to block 1218 where a determination is made as to whether there is at least one primitive left in the set that has not been processed. If there is at least one primitive left in the set of primitives for the current tile that has not been processed, then the method 1200 proceeds back to block 1206 where the next primitive in the set is selected and blocks 1208 to 1216 are repeated for that primitive. If, however, all of the primitives in the set have been processed then the method 1200 proceeds to block 1220.

At block 1220, the depth range for that tile is updated to reflect any change of the range for the tile as a result of the primitives in the set. For example, in some cases, if any of the primitives were determined to be 'in front' of the primitives previously processed for that tile then there will be a 'better' (e.g. lower) depth value for that tile and the depth range for the tile is updated with the 'best' (e.g. lowest) of these depth values.

As described above, in some cases, the HSR logic may be configured to, once it has processed a partial display list for a tile (e.g. the primitive fragments associated with the primitives identified in a partial display list) determine whether the HSR logic has the 'best' depth value for all of the pixel samples in that tile (e.g. the current best depth value buffer has a depth value for each pixel sample in the tile). The HSR logic may comprise the 'best' depth value for all the pixel samples in the tile (a) if processing the partial display list has caused a depth value update to each of the pixel samples in the tile; or (b) if a depth buffer read has been performed for that tile. The HSR logic may not comprise the 'best' depth value for all the pixel samples in the tile if a depth buffer read was not performed for that tile and not all the depth values in the tile were updated by processing the partial display list. If the HSR logic determines that it comprises the 'best' depth value for all of the pixel samples in the tile then the HSR logic may identify the 'worst' (e.g. maximum) depth value for the tile and send a message or command to the coarse depth test logic 320 which causes the coarse depth test logic 320 to update the depth range for that tile to reflect the 'worst' (e.g. maximum) depth value for that tile.

The method 1200 then ends.

Although method 1200 has been described as receiving all of the primitives in a set of primitives for a tile prior to performing the coarse hidden depth test and the coarse front depth test on the individual primitives, it will be evident to a person of skill in the art that this is an example only and that in other examples the primitives may arrive sequentially and as soon as a primitive is received the coarse hidden depth test may be performed on that primitive, and if necessary, the coarse front depth test may be performed on that primitive. In other words, the coarse hidden depth test and/or the coarse front depth test may be performed for a primitive in a set before all of the primitives in the set have been received.

As described above, in some cases a record (e.g. pixel sample map) of the pixel samples in the tile for which the HSR logic will have the 'best' depth value is maintained and if a primitive is not determined to have a 'better' depth than the primitives previously processed for the tile (i.e. a primitive is a 'not in front' primitive), a further test based on the record is performed for the 'not in front' primitive to determine if the depth buffer read can be avoided for that 'not in front' primitive. In some cases, the record may be updated after identifying an 'in-front' primitive to indicate that after that 'in front' primitive is processed the HSR logic will have the 'best' depth values for the pixel samples in the tile associated with that 'in front' primitive. In some cases, the record may be also updated after identifying a primitive that requires a depth buffer read to indicate that after that depth buffer read primitive is processed the HSR logic will have the 'best' depth values for all the pixel samples in the tile.

Figure 13:
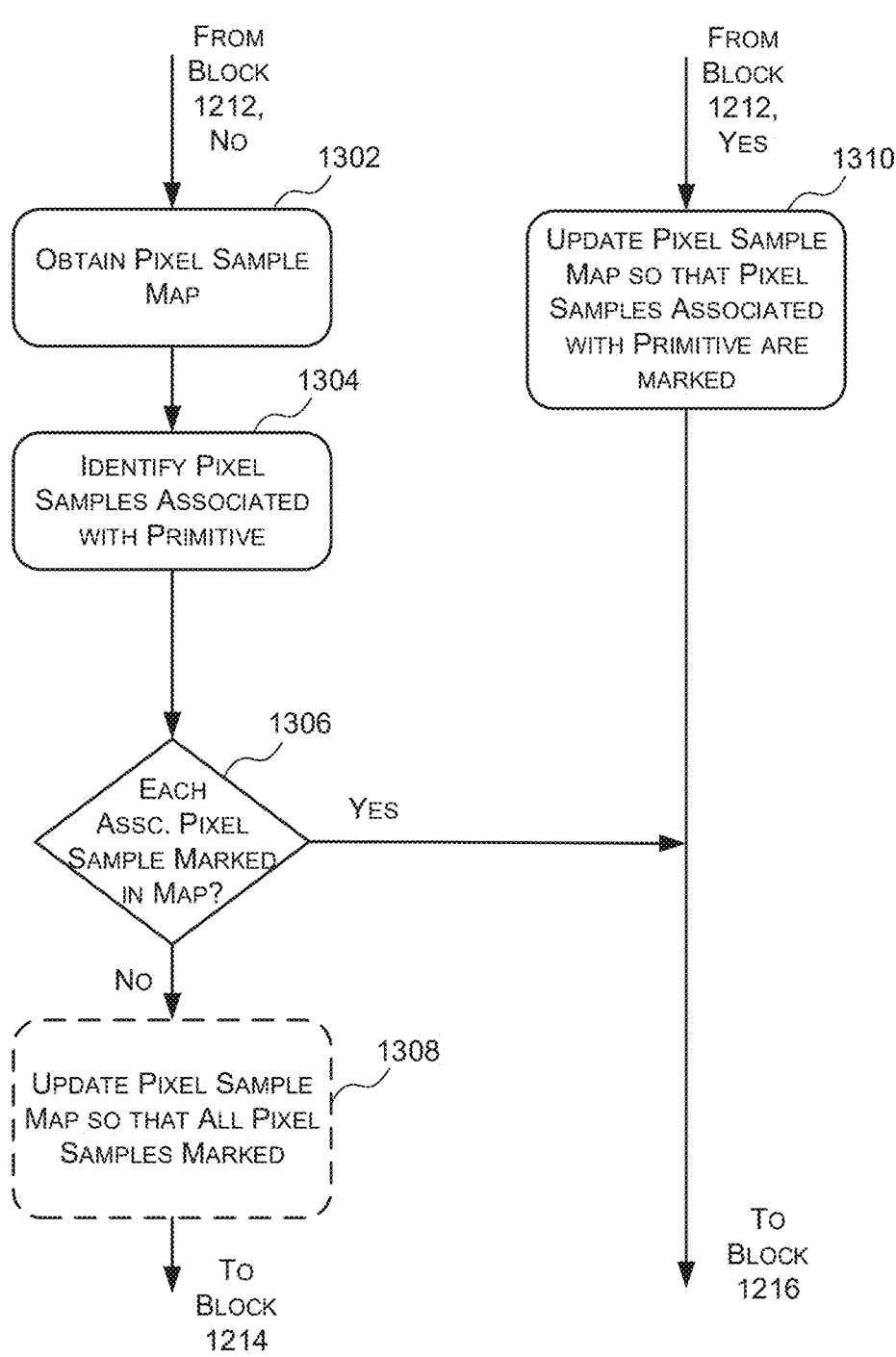
FIG. 13 is a flow diagram of a first example set of optional steps for the method of FIG. 12.

Reference is now made to FIG. 13 which illustrates optional blocks which may be added to the method 1200 of FIG. 12 to implement this. Specifically, as shown in FIG. 13 if it is determined at block 1212 of the method 1200 of FIG. 12 that a primitive does not have a 'better' depth than the primitives previously processed for the tile (i.e. if it is determined that a primitive is a 'not in front' primitive) then the method 1200 may proceed to block 1302 where the record (e.g. pixel sample map) of the pixel samples in the tile for which the HSR logic will have the 'best' depth values (to date) is obtained. Once the record has been obtained the method 1200 proceeds to block 1304 where the pixel sample(s) associated with the primitive are identified. As described above, a pixel sample is associated with a primitive if the primitive overlaps with that pixel sample position. The pixels sample(s) of the tile associated with a primitive may be determined in any suitable manner. For example, if block 1304 is performed after rasterization of the primitive then there may be one or more primitive fragments for that primitive, each of which corresponds to a particular pixel sample. In these cases, if there is a primitive fragment that corresponds to a particular pixel sample, then the primitive is associated with that pixel sample.

Once the pixel samples of the tile which are associated with the primitive have been identified the method 1200 proceeds to block 1306 where a determination is made as to whether the record (e.g. pixel sample map) indicates that the HSR logic will have the 'best' depth value for each of the pixel samples associated with the primitive (indicating that each pixel sample associated with the primitive is related to an earlier 'in front' primitive in the set or (optionally) that the primitive was preceded in the set by a depth buffer read primitive). If it is determined that the HSR logic will have the 'best' depth value for all of the pixel samples associated with the primitive then a depth buffer read is not required for this primitive and the method 1200 proceeds to block 1216 where the primitive is identified as a no depth buffer read primitive. As described above, this is because if all of the pixel samples associated with a 'not in front' primitive are related to at least one 'in front' primitive then the 'best' depth value for those pixel samples when the primitive is processed by the HSR logic will be either the depth value of the 'not in front' primitive or one of the preceding 'in front' primitives thus the values in the depth buffer are not necessary to identify the 'best' depth value for those pixel samples; or (optionally) if the primitive is preceded by a depth buffer read primitive then when the primitive is processed by the HSR logic the HSR logic will have the 'best' depth values for all of the pixel samples.

If, however, it is determined at block 1306 that the HSR logic will not have the 'best' depth value for at least one pixel sample associated with the primitive, then the primitive is a 'depth buffer read' primitive and the method 1200 proceeds to block 1214 where the primitive is output for further processing. In some cases, after determining that a primitive is a 'depth buffer read' primitive, and prior to proceeding to block 1214 the method 1200 may proceed to block 1308 where the record (e.g. pixel sample map) is updated to indicate that the HSR logic will have the 'best' depth value for all of the pixel samples in the tile. This is because a 'depth buffer read' primitive will trigger a depth buffer read, therefore after the depth buffer read primitive is processed the HSR logic will have the current 'best' depth values for all of the pixel samples in the tile.

If it is determined at block 1212 of the method 1200 of FIG. 12 that a primitive has a 'better' depth than the primitives previously processed for that tile the method 1200 may proceed to block 1310 prior to proceeding to block 1216. At block 1310 the record (e.g. pixel sample map) that indicates which pixel samples of the tile the HSR logic will have the 'best' depth value is updated so that the record indicates that the HSR logic will have the 'best' depth value for each of the pixel samples associated with the 'in front' primitive.

Where the coarse depth test logic 320 maintains a record (e.g. pixel sample map) of the pixel samples in the tile for which the HSR logic will have the 'best' depth value is maintained; and the record (e.g. pixel sample map) is updated after an 'in front' primitive is identified to indicate that the HSR logic will have the 'best' depth value for each of the pixel samples in the tile associated with that 'in front' primitive, and after a depth buffer read primitive is identified to indicate that the HSR logic will have the 'best' depth value for all of the pixel samples in the tile; then a further test based on the record may be performed on 'in front' primitives based on the record to determine if a full resolution depth test can be avoided for that 'in front' primitive.

Figure 14:
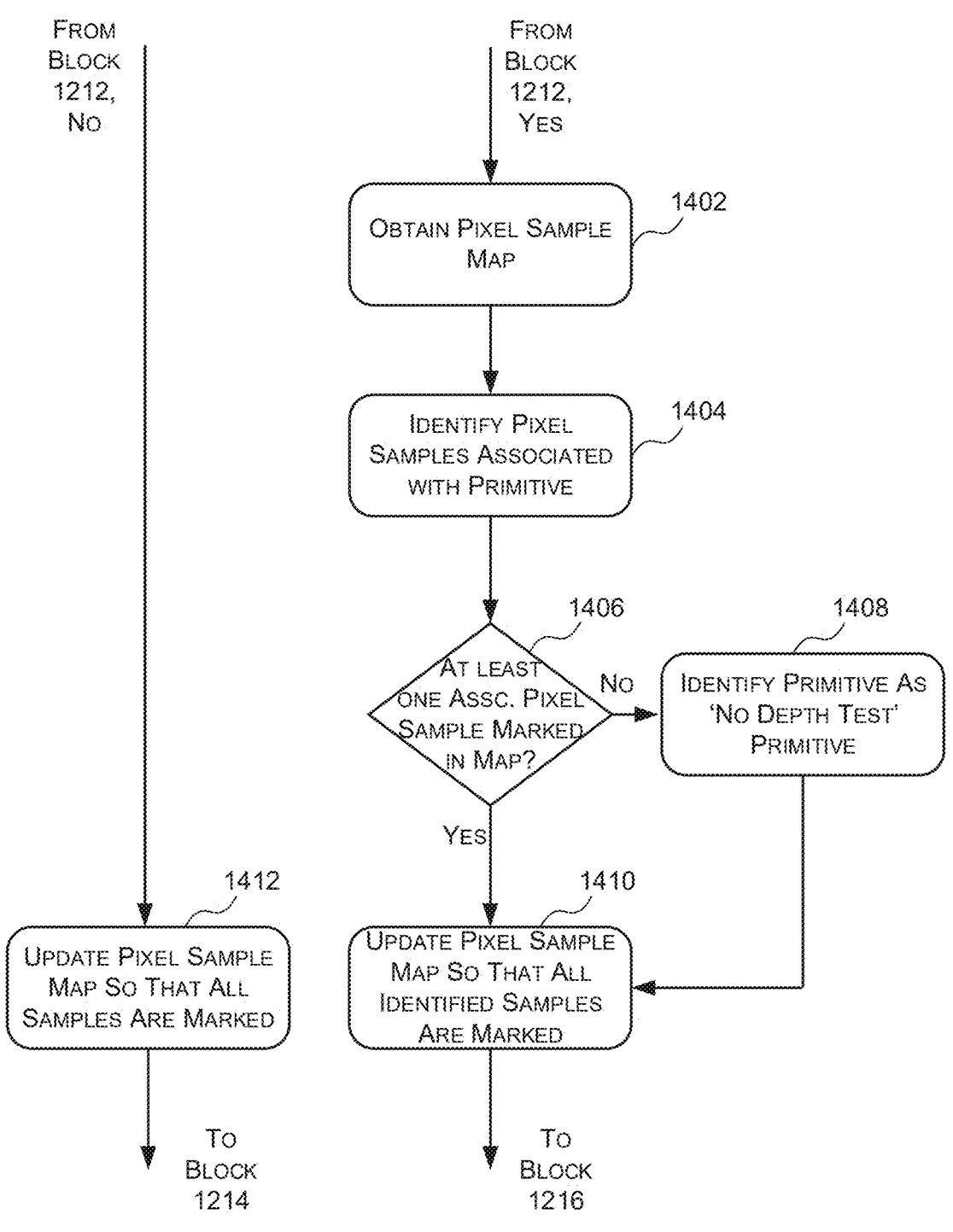
FIG. 14 is a flow diagram of a second example set of optional steps for the method of FIG. 12.

Reference is now made to FIG. 14 which illustrates optional blocks which may be added to the method 1200 of FIG. 12 to implement this. Specifically, as shown in FIG. 14 if it is determined at block 1212 of the method 1200 of FIG. 12 that a primitive is an 'in front' primitive (i.e. the primitive has better (e.g. smaller) depth than the primitives previously processed for the tile) then the method 1200 may proceed to block 1402 where the record (e.g. pixel sample map) of the pixel samples in the tile for which the HSR logic has the 'best' depth value is obtained. Once the record has been obtained the method 1200 proceeds to block 1404 where the pixel sample(s) associated with the 'in front' primitive are identified. As described above, a pixel sample is associated with a primitive if the primitive overlaps that pixel sample position. The pixel sample(s) of the tile associated with a primitive may be determined in any suitable manner. For example, if block 1404 is performed after rasterization of the 'in front' primitive, then there may be one or more primitive fragments for that primitive each of which corresponds to a particular pixel sample. In these cases, if there is a primitive fragment that corresponds to a particular pixel sample then the primitive is associated with that pixel sample.

Once the pixel samples of the tile which are associated with the 'in front' primitive have been identified the method 1200 proceeds to block 1406 where a determination is made as to whether the record (e.g. pixel sample map) indicates that the HSR logic has the 'best' depth value for any of the pixel samples associated with the primitive (i.e. any of the pixel samples associated with the primitive are related to at least one earlier 'in front' primitive in the set, or the 'in front' primitive was preceded in the set by a depth buffer read primitive). If it is determined at block 1406 that the HSR logic will not have the 'best' depth value for any of the pixel samples associated with the primitive (i.e. none of the pixel samples associated with the 'in front' primitive are related to an earlier 'in front' primitive in the set and the primitive was not preceded in the set by a depth buffer read primitive) then a full resolution depth test is not required for this 'in front' primitive and the method 1200 proceeds to block 1408 where the primitive is identified as a 'no depth test' primitive and then to block 1410. As described above, this is because if none of the pixel samples associated with an 'in front' primitive are related to an earlier 'in front' primitive and the primitive was not preceded by a 'depth buffer read' primitive then the 'best' depth values for these pixel samples to date are the depth values from this primitive and the depth values of this primitive can be directly recorded as the best depth values to date.

If it is determined at block 1406 that the HSR logic will have the 'best' depth value for at least one of the pixel samples associated with the primitive then a full resolution depth test may be required and the method 1200 proceeds to block 1410 where the record (e.g. pixel sample map) is updated so that the record indicates that the HSR logic will have the 'best' depth value for each of the pixel samples associated with the 'in front' primitive. After block 1410 the method 1200 proceeds to block 1216 where the primitive is identified as a 'no depth buffer read' primitive.

If it is determined at block 1212 of the method 1200 of FIG. 12 that a primitive is a depth buffer read primitive the method 1200 may proceed to block 1412 where the record (e.g. the pixel sample map) is updated to indicate that the HSR logic will have the 'best' depth value for all of the pixel samples in the tile. The method 1200 then proceeds to block 1214.

In some cases, instead of performing the hidden depth test on a primitive basis the hidden depth test may be performed on a primitive fragment basis. For example, in some cases the primitives may be converted (i.e. rasterized) into primitive fragments before they are provided to the hidden depth test logic 404 such that the hidden depth test logic 404 receives a set of primitive fragments related to a tile. Then for each primitive fragment in the set, the hidden depth test logic 404 may be configured to determine whether that primitive fragment is hidden in the tile by the previously processed primitives for the tile. When DCM_LESS mode is implemented a primitive fragment may be determined to be hidden in the tile by the previously processed primitives for that tile if the depth value of the primitive fragment is greater than the maximum depth value for the tile as defined by the depth range for the tile. If it is determined that a primitive fragment is hidden in the tile, then no further processing of that primitive fragment may be performed with respect to that tile. If, however, it is determined that a primitive fragment is not hidden in the tile then that primitive fragment may be output to the front depth test logic 406.

In some cases, instead of performing the no depth buffer read and/or the no full resolution depth test determination on a primitive basis the no depth buffer read and/or the no full resolution depth test determination may be made on a primitive fragment basis. For example, after a primitive has passed the coarse hidden depth test that primitive may be converted (i.e. rasterized) into one or more primitive fragments which are provided to the front depth test logic 406, or the primitives in a set may be converted (i.e. rasterized) into primitive fragments before the coarse hidden depth test and any primitive fragment which passes the coarse hidden depth test may be provided to the front depth test logic 406. Then for each primitive fragment that is received, the coarse front depth test logic may determine whether that primitive fragment has a better depth value than the previously processed primitives for the tile. When DCM_LESS mode is implemented a primitive fragment may be determined to have a 'better' depth value than the previously processed primitives for that tile if the depth value of the primitive fragment is less than the minimum depth value of the tile as defined by the depth range for the tile. If it is determined that a primitive fragment has a 'better' depth value than the previously processed primitives for the tile, then the primitive fragment may be identified as a 'no depth buffer read' primitive fragment. In some cases, a record (e.g. pixel sample map as described above) of the pixel samples of the tile the HSR logic will have the 'best' depth value is maintained. In these cases if a primitive fragment is not determined to have a 'better' depth value than the previously processed primitives for the tile (i.e. a 'not in front' primitive fragment), then a determination may be made as to whether that primitive fragment is a 'no depth buffer read' primitive fragment based on the record. For example, if the record indicates that the HSR logic will have the 'best' depth value for the pixel sample associated with the primitive fragment then the 'not in front' primitive fragment may be identified as a 'no depth buffer read' primitive fragment. In some cases, if it is determined that a primitive fragment has a better depth than the previously processed primitives for the tile (i.e. an 'in front' primitive fragment) then a determination may be made as to whether that 'in front' primitive fragment is a 'no depth test' primitive fragment based on the record. For example, in some cases if the record indicates that the HSR logic does not have the 'best' depth value for the pixel sample associated with that 'in front' primitive fragment then the primitive fragment may be identified as a 'no depth test' primitive fragment.

Example Methods for Determining the Maximum and/or Minimum Depth Value of a Primitive in a Tile Example methods for determining the maximum and/or minimum depth value of a primitive in a tile prior to rasterization of the primitive will now be described. Any of these methods may be used by the hidden depth test logic 404 and/or the front depth test logic 406 of the coarse depth test logic 320 of FIG. 4. In these examples it is presumed that the primitives are planar.

Figure 15:
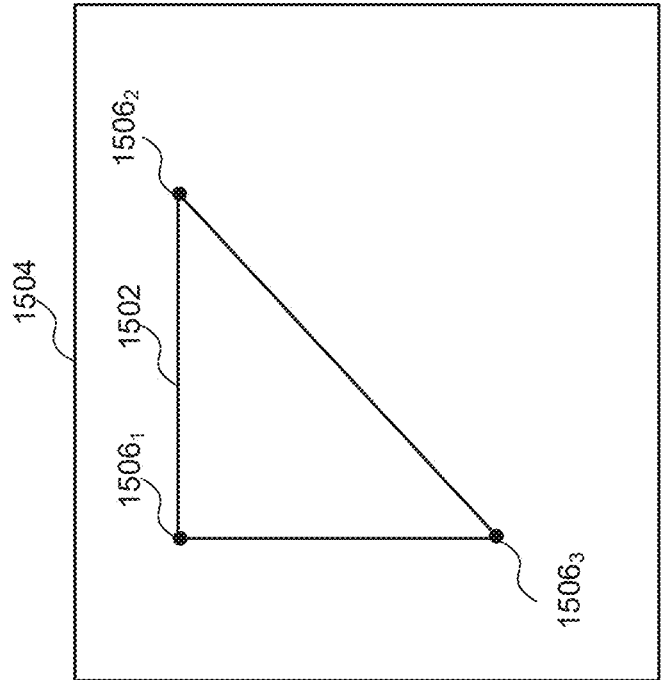
FIG. 15 is a schematic diagram illustrating a first example method of determining the maximum or minimum depth of a primitive in a tile.

In a first example method, which may be used when a primitive 1502 is completely within the tile 1504 as shown in FIG. 15, the maximum or minimum depth of a primitive 1502 in a tile 1504 may be estimated to be the maximum or minimum depth of the vertices $1506_1$, $1506_2$ and $1506_3$ of the primitive 1502. A determination of whether a primitive 1502 is completely within a tile 1504 may be made by defining a bounding box (e.g. an axis-aligned bounding box) around the primitive and determining if the bounding box lies completely within the bounds of the tile. As is known to those of skill in the art, a bounding box is the minimum or smallest bounding or enclosing axis-aligned box for a set of points within which all the points lie. Therefore a bounding box for a primitive may be defined as the smallest axis-aligned rectangle (where "rectangle" includes "square") that encompasses all the vertices.

Figure 16:
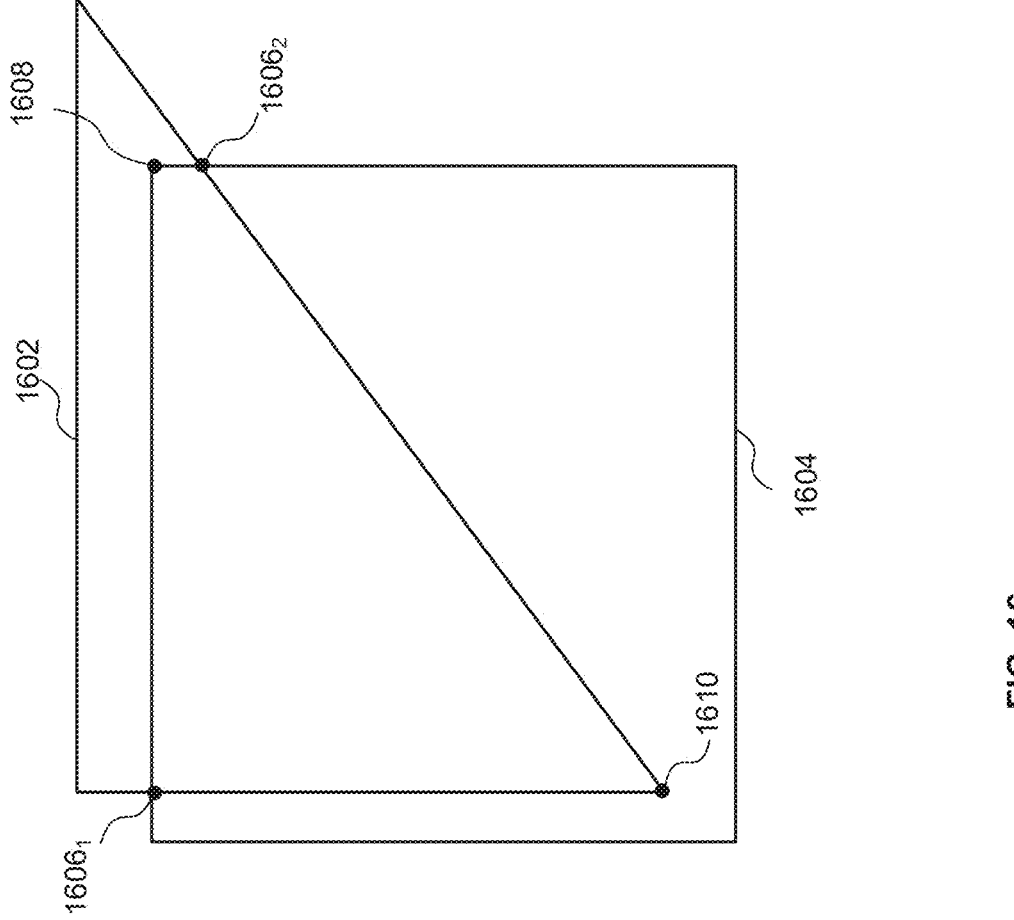
FIG. 16 is a schematic diagram illustrating a second example method of determining the maximum or minimum depth of a primitive in a tile.

In a second example method, which may be used when the primitive 1602 is not completely within the tile 1604 as shown in FIG. 16, the maximum or minimum depth of a primitive 1602 in a tile 1604 may be estimated to be the maximum or minimum depth of the following which apply to the primitive 1602:

an intersection $1606_1$, $1606_2$ of an edge of the primitive with an edge of the tile 1604;

the primitive 1602 at the position of a corner 1608 of the tile 1604 within the primitive 1602; and a vertex 1610 of the primitive 1602 within the tile 1604.

In a third example method the maximum or minimum depth of a primitive in a tile may be estimated to be:

If the primitive completely covers the tile, then the maximum or minimum depth of the primitive in the tile is estimated to be the maximum or minimum depth of the primitive at the position of the corners of the tile; and If the primitive does not completely cover the tile, then the plane of the primitive is extended to the corners of the tile and the maximum or minimum depth of the primitive in the tile is estimated to be the maximum or minimum depth at the position of the corners of the tile within the extended plane.

Figure 17:
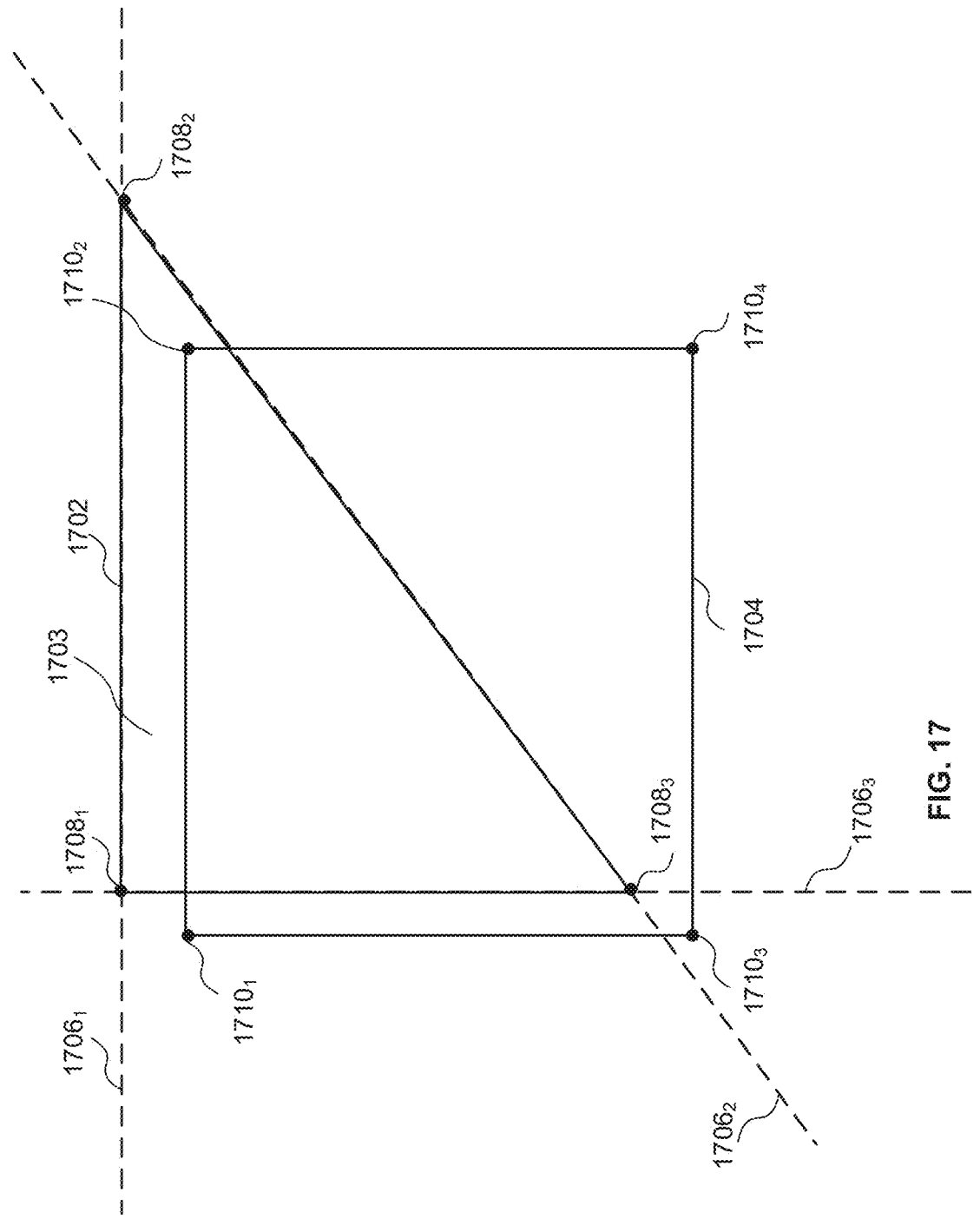
FIG. 17 is a schematic diagram illustrating a third example method of determining the maximum or minimum depth of a primitive in a tile.

Specifically, as shown in FIG. 17, each primitive 1702 lies on a plane 1703 which can be defined as the interior of the planes $1706_1$, $1706_2$, $1706_3$ on which the edges of the primitive 1702 lie. For example, as shown in FIG. 17, a triangle primitive 1702 may be defined as the interior of the three planes $1706_1$, $1706_2$, $1706_3$ on which the edges of the triangle lie. The depth at any point (x, y) on the plane 1703 on which the triangle primitive lies is equal to Ax+By+C wherein x is the x-coordinate, y is the y-coordinate, and A, B and C are coefficients. It is well known that the coefficients A, B and C can be determined from the coordinates (x, y, z) of the vertices $1708_1$, $1708_2$, $1708_3$ of the triangle primitive.

Accordingly the depth of the plane 1703 at the corner positions $1710_1$, $1710_2$, $1710_3$, $1710_4$ of the tile 1704 can be determined from Ax+By+C.

In some cases, the rasterizer (e.g. rasterizer 312) may be configured to determine the depth of a primitive fragment, by calculating A, B and C from the vertices of the primitives and then calculating Ax+By+C. In these cases, since the hardware is already capable of determining A, B and C for a primitive, it may be efficient to determine the maximum or minimum depth of the primitive in a tile in this manner.

It is noted that generally the pixel sample points of a tile will not lie on the tile boundary (and specifically not on the tile corners) nor do they generally align exactly with the vertex of a primitive. Therefore estimating the maximum or minimum depth of a primitive in a tile based on: the depth of the primitive (or the depth of an extended plane on which the primitive lies) at the corner of a tile, the depth of the primitive at the intersection of an edge of the primitive and an edge of the tile, and/or the vertex of a primitive, may result in the estimated maximum depth of the primitive in the tile being higher than the actual maximum depth of any of the primitive fragments generated for the primitive in the tile, or the estimated minimum depth of the primitive in the tile being smaller than the actual minimum depth of any of the primitive fragments generated for the primitive in the tile. Accordingly these estimates are conservative estimates which means that a primitive might not be culled by the coarse depth test logic even though it could have been culled, but a primitive will not be culled by the coarse depth test logic if it shouldn't be culled. Since the rasterization logic can still generate the correct raster output if a primitive that should have been culled was not culled, but might not generate the correct raster output if a primitive that shouldn't have been culled was culled, the rasterization logic will still be able to generate a correct raster output with a conservative estimate implemented by the coarse depth test logic.

It will be evident to a person of skill in the art that these are example methods only and the maximum and minimum depth of a primitive in a tile may be determined/estimated in any suitable manner.

Test Results

Figure 18:
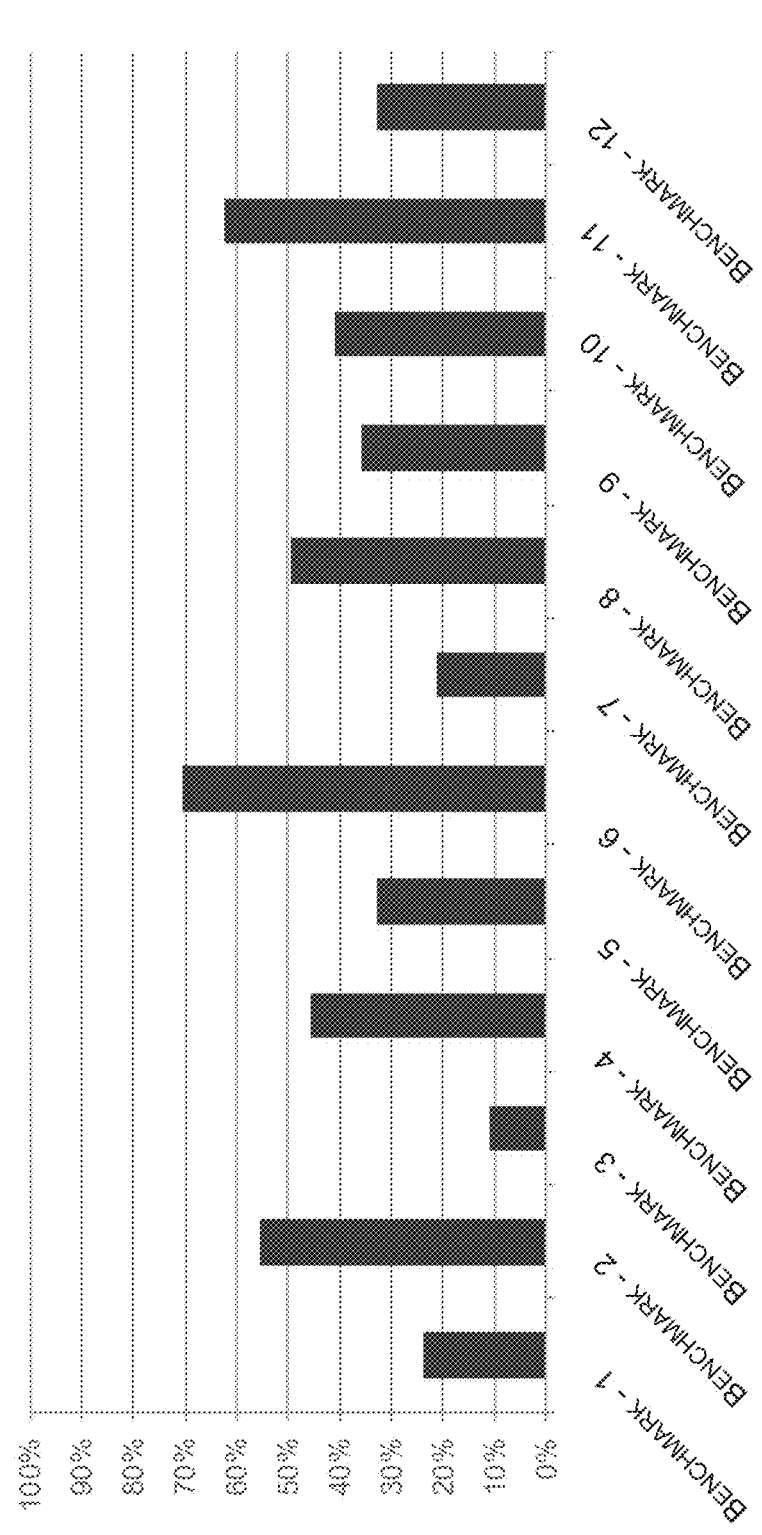
FIG. 18 is a graph illustrating the reduction in depth buffer read bandwidth for a number of benchmarks when the coarse depth testing method of FIG. 12 is implemented.

Reference is now made to FIG. 18 which illustrates the reduction in the depth buffer fetch bandwidth for a number of graphics processing system benchmark tests when the coarse depth testing is performed in accordance with the method 1200 of FIG. 12 prior to performing full resolution depth testing. In can be seen that for all benchmarks the depth buffer fetch bandwidth was reduced and for some benchmarks the depth buffer fetch bandwidth was reduced by almost 90%.

Slow and Fast Rasterization Queues

Figure 19:
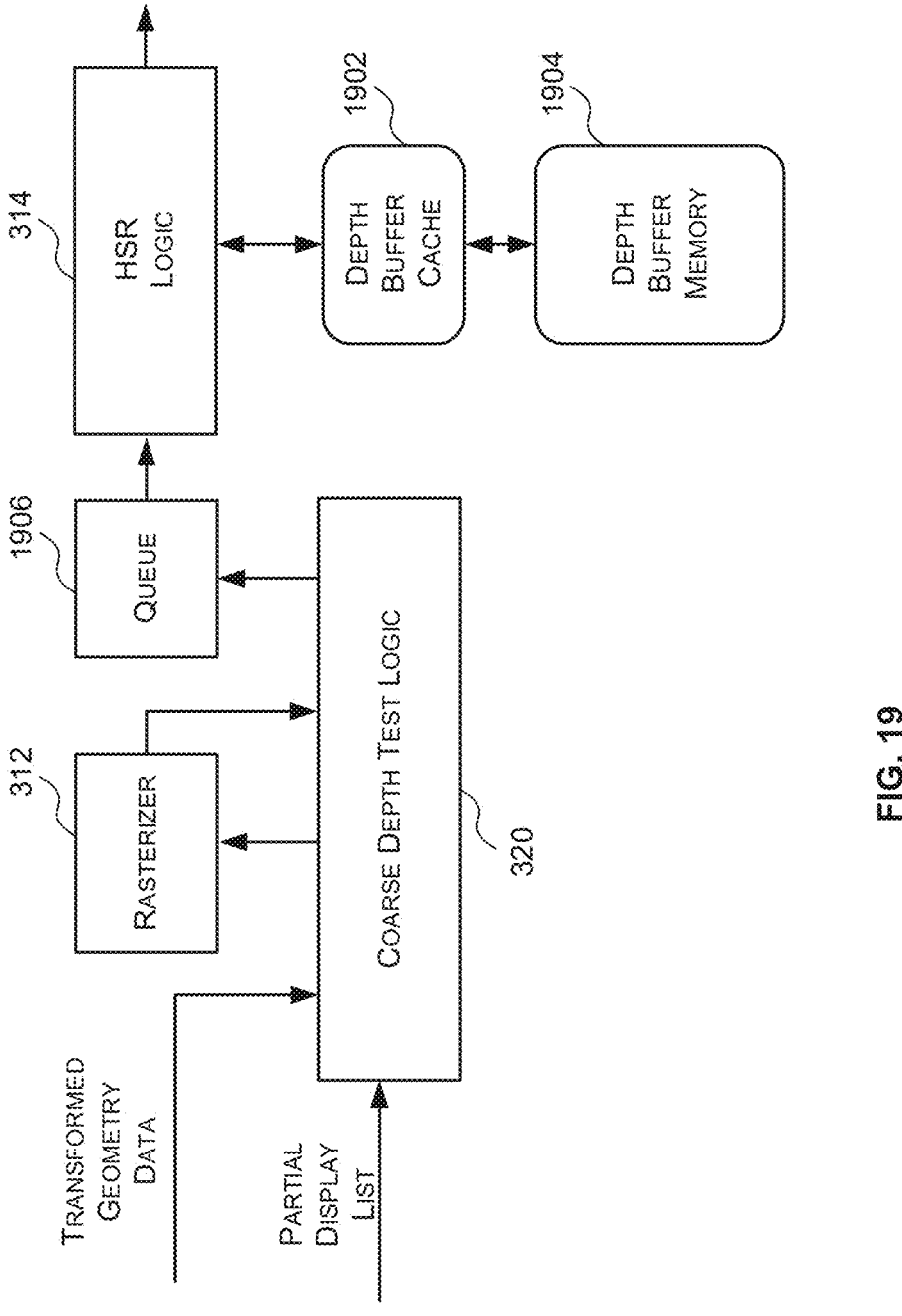
FIG. 19 is a block diagram of an example system for processing primitives in the rasterization phase where a queue is placed between the coarse depth test logic and the HSR logic.

As described above, causing a read of the depth buffer for a tile from memory only if the HSR logic will not already have the information to identify the 'best' depth for the pixel sample(s) associated with a primitive/primitive fragment may significantly reduce the number of depth buffer reads that are performed. However, as depth buffers are not automatically pre-fetched this may cause latency issues in the rasterization phase. Specifically, if a depth buffer read is required for a primitive fragment that the HSR logic receives and that depth buffer is not in the depth buffer cache 1902 then a read of the depth buffer memory 1904 is performed. There may be significant latency associated with a read of the depth buffer memory 1904. Accordingly, to ensure that the HSR logic is not stalled while it is waiting for a depth buffer memory read to be performed, a queue 1906 (as shown in FIG. 19) may be inserted between the coarse depth test logic 320 and the HSR logic 314 to store a certain number of primitive fragments that have been output by the coarse depth test logic. This allows the HSR logic 314 to keep processing primitive fragments while a depth buffer memory read is being performed for one primitive fragment (or a set of primitive fragments) in the queue 1906. However, tests indicate that to mask the latency associated with a depth buffer memory read the queue 1906 would have to be quite large (e.g. tests indicate that in some cases the queue 1906 may need to be able to store the data for one hundred primitive fragments to mask the latency associated with a depth buffer memory read).

There is thus a desire to mask the latency associated with depth buffer memory reads without such a large queue 1906. The inventors have identified that the queue 1906 can be implemented more efficiently as two queues wherein only primitive fragments that are identified as not requiring a depth buffer read are placed in a priority queue and any primitive fragment that is identified as requiring a depth buffer read is placed in a non-priority queue. The HSR logic 314 may be configured to prioritize primitive fragments in the priority queue over primitive fragments in the non-priority queue. In some cases, as described in more detail below, the HSR logic 314 may be configured to only process primitive fragments in the non-priority queue if the priority queue is empty unless one or more exception conditions are met. Prioritizing the primitive fragments in the priority queue allows the latency associated with depth buffer memory reads to be masked more efficiently than with a single queue.

Figure 20:
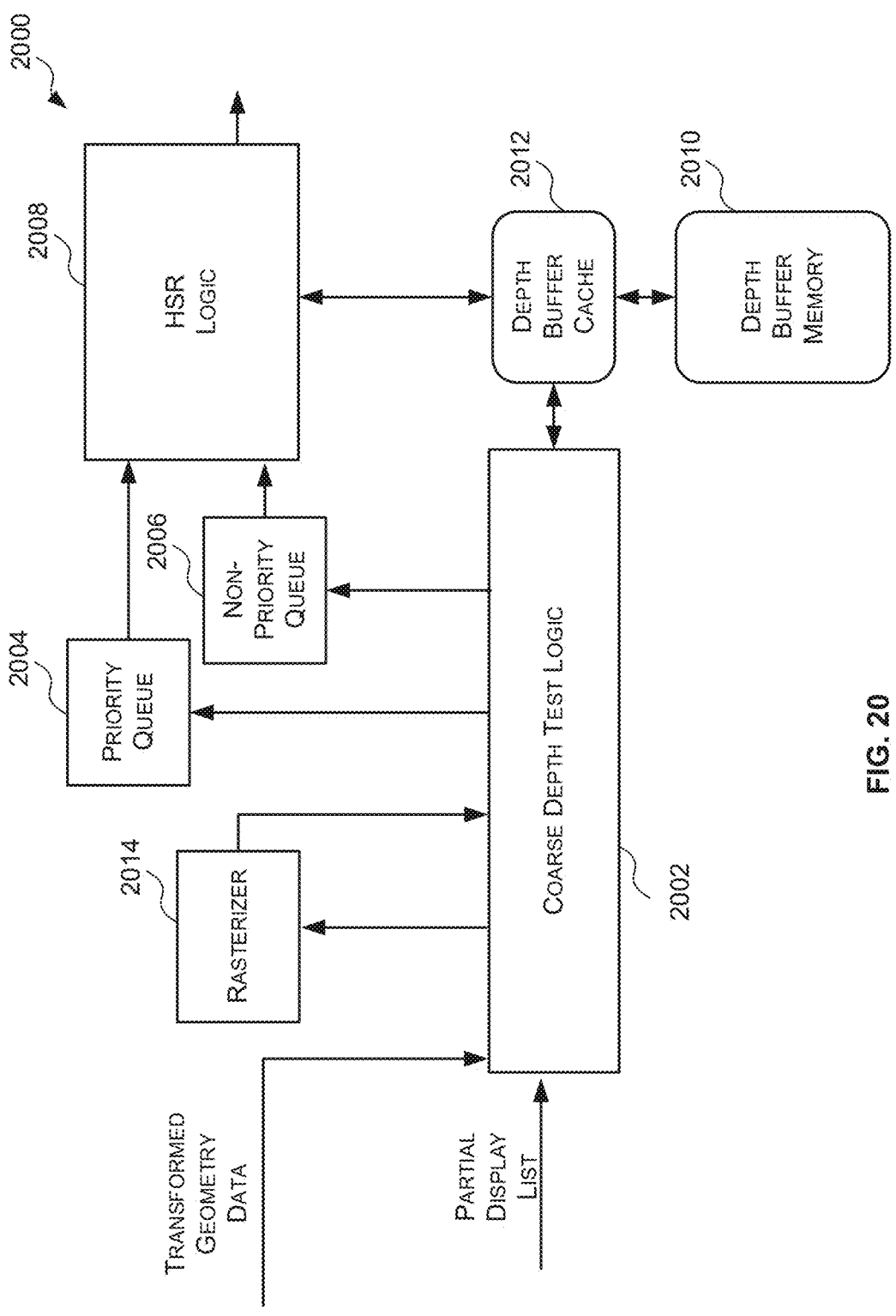
FIG. 20 is a block diagram of an example system for processing primitives in the rasterization phase where two queues are placed between the coarse depth test logic and the HSR logic.
Figure 21:
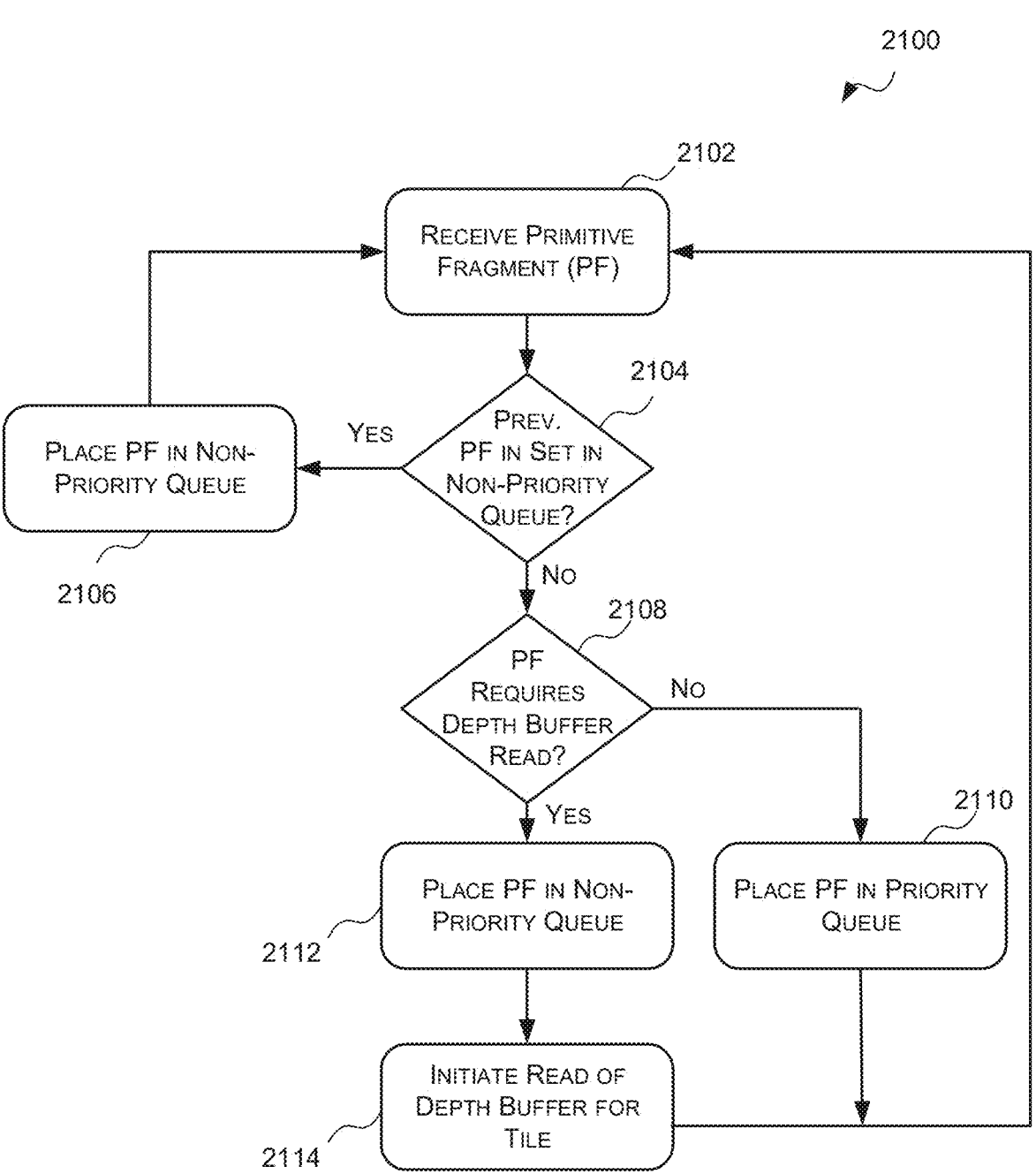
FIG. 21 is a flow diagram of an example method of sorting primitives into the two queues of FIG. 20.
Figure 22:
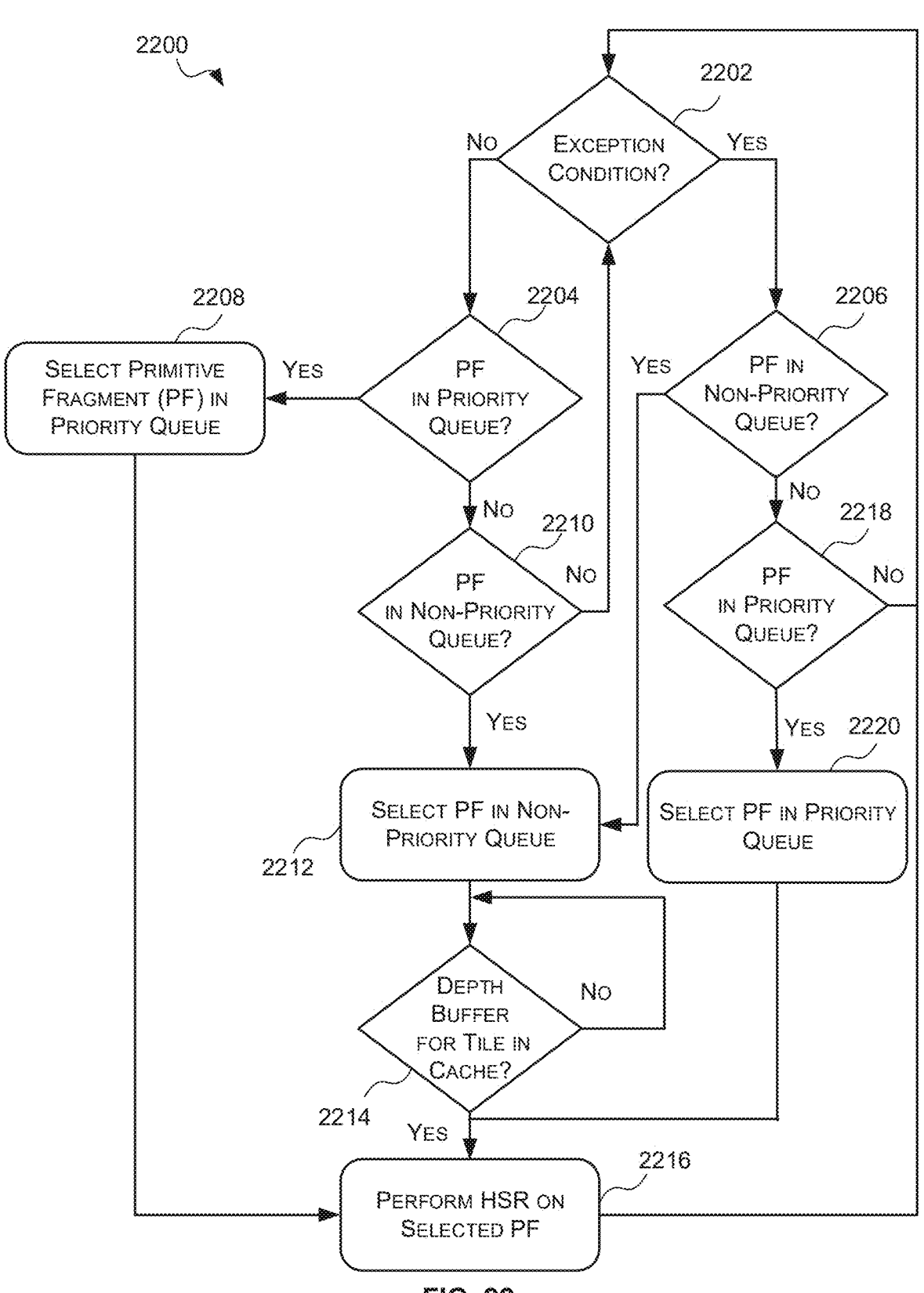
FIG. 22 is a flow diagram of an example method of selecting primitives from the two queues of FIG. 20 to process.

Although the systems and methods of FIGS. 20 to 22 are described as being used in a hybrid rendering graphics processing system, their use is not limited to hybrid rendering graphics systems and in other examples they may be used or implemented in other graphics processing systems.

Reference is now made to FIG. 20 which illustrates an example system 2000 for processing primitive fragments in the rasterization phase of a hybrid rendering graphics processing system. The system 2000 comprises logic 2002 for receiving primitive fragments to be rendered and determining, for at least some of the received primitive fragments, whether a depth buffer read is required to perform full resolution hidden surface removal; a priority queue 2004; a non-priority queue 2006; and HSR logic 2008 to perform full resolution hidden surface removal on the primitive fragments in the queues 2004 and 2006.

The logic 2002 is configured to receive primitive fragments to be rendered, each primitive fragment associated with a tile; determine, for at least some of the received primitive fragments whether a depth buffer read is required to perform full resolution hidden surface removal on that primitive fragment for the associated tile; and sort the primitive fragments into the queues based on the depth buffer read determinations. The logic 2002 may determine whether a depth buffer read is required for a primitive fragment in any suitable manner. For example, the logic 2002 may be configured to determine whether a depth buffer read is required for a primitive/primitive fragment according to any of the methods described above in relation to the coarse depth test logic 320. For example, the logic 2002 may be configured to perform a coarse hidden depth test on a per primitive basis or a per primitive fragment basis; and/or a coarse front depth test on a per primitive or a per primitive fragment basis to determine whether a depth buffer read is required. In some examples, such as that shown in FIG. 20, the logic 2002 may be implemented as the coarse depth test logic (e.g. coarse depth test logic 320) described above which may further comprise sorting logic (not shown) for sorting the primitives into the queues 2004, 2006 based on the depth buffer read determinations.

In some cases, the logic 2002 may be configured to place only primitive fragments that do not require a depth buffer read in the priority queue 2004 and to place primitive fragments that require a depth buffer read in the non-priority queue 2006. In some cases, the logic 2002 may also be configured to place any primitive fragment in a set of primitive fragments for a tile (e.g. the primitive fragments corresponding to primitives in a partial display list) in the non-priority queue 2006 if a preceding primitive fragment in the set has been identified as requiring a depth buffer read. In other words, in some cases as soon as one primitive fragment in a set of primitive fragments related to a tile (e.g. the primitive fragments corresponding to primitives in a partial display list) has been placed in the non-priority queue 2006 all of the following or subsequent primitive fragments in the set may be placed in the non-priority queue. This may be advantageous because in general the primitive fragments related to a tile are to be processed in the order in which they are received and thus once a primitive fragment in a set of primitive fragments related to a tile requires a depth buffer read then all the subsequent primitive fragments must also wait for the depth buffer read to complete. An example method for sorting primitive fragments into the queues, which may be implemented by the logic 2002, is described below with reference to FIG. 21.

In some cases, the logic 2002 may be configured to place a primitive fragment in a queue 2004, 2006 by adding information or data defining the primitive fragment (e.g. the co-ordinates (X, Y and Z) thereof) to the queue 2004, 2006. In other cases, the logic 2002 may be configured to place/ store a primitive fragment in a queue by placing or adding information to the queue that identifies the primitive fragment (e.g. a primitive fragment identifier). The information or data defining the primitive (e.g. the co-ordinates (X, Y, and Z) thereof) may be stored in memory (e.g. a buffer). In these cases, the HSR logic may be configured to, once it has selected a primitive fragment from the queue, use the information identifying the primitive fragment (e.g. the primitive fragment identifier) to retrieve the information or data defining the primitive (e.g. the co-ordinates (X, Y, and Z) thereof) from the memory. In some cases the primitive fragment identifiers and/or information or data defining the primitive fragments relating to the same primitive may be stored in the queues together.

In some cases, the logic 2002 may be configured to, in response to placing the first primitive fragment of a set of primitive fragments related to a tile in the non-priority queue, initiating a read of the depth buffer for that tile from memory 2010. In some cases, this may entail sending a request for the depth buffer for that tile to the depth buffer cache 2012 and if the depth buffer cache 2012 does not comprise the requested depth buffer then performing a read of that depth buffer from memory 2010.

The HSR logic 2008 is configured to perform full resolution hidden surface removal on the primitive fragments in the queues 2004 and 2006 wherein priority is given to the primitive fragments in the priority queue. Giving priority to primitives in the priority queue means that generally the primitive fragments in the priority queue 2004 are processed before the primitive fragments in the non-priority queue 2006. Specifically, in some cases the HSR logic 2008 may be configured to only process primitive fragments in the non-priority queue 2006 if there are no primitive fragments in the priority queue 2004 unless one or more exception conditions are met. The one or more exception conditions which may allow the HSR logic 2008 to process a primitive fragment in the non-priority queue 2006 when the priority queue 2004 is not empty may include one or more of: the first/top primitive fragment in the non-priority queue 2006 relates to a tile for which the depth buffer is in the depth buffer cache 2012; the depth buffer cache 2012 is full (or almost full); and the number of primitive fragments in the non-priority queue 2006 exceeds a threshold (e.g. the non-priority queue 2006 becomes too full). An example method for selecting the primitive fragments from the queues 2004, 2006 which may be implemented by the HSR logic 2008 is described below with reference to FIG. 22.

Reference is now made to FIG. 21 which illustrates an example method 2100 of sorting primitive fragments into the priority and non-priority queues 2004, 2006. The method 2100 begins at block 2102 where the logic 2002 (e.g. coarse depth test logic 320) receives a primitive fragment. The primitive fragment may be part of a set of primitive fragments associated with a particular tile (e.g. the primitive fragment may be one of one or more primitive fragments corresponding to, or generated from, the primitives in a partial display list). As described above, a primitive fragment may be received at the logic 2002 when data identifying and/or defining that primitive fragment is received. In some cases, the data identifying and/or defining a primitive fragment may be received from the geometry processing logic. Once the primitive fragment has been received the method 2100 may proceed to block 2104.

At block 2104, a determination is made at the logic 2002 as to whether any preceding primitive fragments of the same set of primitive fragments related to a tile (e.g. primitive fragments corresponding to primitives identified in a partial display list for a tile) have been placed in the non-priority queue. In other words, a determination is made as to whether any preceding primitive fragments of the same set were identified as requiring a depth buffer read. If it is determined at block 2104 that at least one primitive fragment of the same set of primitive fragments related to a tile has been placed in the non-priority queue the method 2100 proceeds to block 2106 where the primitive fragment is placed in the non-priority queue 2006. If, however, it is determined at block 2104 that none of the preceding primitive fragments of the same set of primitive fragments was placed in the non-priority queue then the method 2100 proceeds to block 2108.

At block 2108, a determination is made at the logic 2002 as to whether the primitive fragment requires a depth buffer read for full resolution hidden surface removal. The determination as to whether a primitive fragment requires a depth buffer read may be made in any suitable manner using any suitable criteria. For example, the logic 2002 may be configured to determine whether a depth buffer read is required using any of the methods described above in relation to the coarse depth test logic 320. For example, the logic 2002 may be configured to determine whether a depth buffer read is required by performing a coarse front depth test on a primitive basis or on a primitive fragment basis.

If it is determined at block 2108 that the primitive fragment does not require a depth buffer read, then the method 2100 proceeds to block 2110 where the primitive fragment is placed in the priority queue 2004. If, however, it is determined at block 2108 that the primitive fragment does require a depth buffer read then the method 2100 proceeds to blocks 2112 and 2114 where the primitive fragment is placed in the non-priority queue 2006 and a read of the depth buffer for the relevant tile is initiated. As described above, a read of the depth buffer for the relevant tile may be initiated by, for example, sending a request for the depth buffer for the relevant tile to the depth buffer cache. This may cause the depth buffer cache to determine if it comprises the depth buffer for the relevant tile. If the cache determines that it does not comprise the depth buffer for the relevant tile, then a read of the depth buffer memory may be performed to retrieve the depth buffer for the relevant tile.

Reference is now made to FIG. 22 which illustrates an example method 2200 for processing the primitive fragments in the queues 2004, 2006, which may be implemented by the HSR logic 2008. In this example, the HSR logic 2008 is configured to process primitive fragments that relate to the same tile in the order in which they are in the queues, however, the HSR logic 2008 can process tiles out of order. For example, the HSR logic 2008 may be able to process the primitive fragments of tile X, before it has processed all of the primitive fragments with respect to tile Y, even if the primitive fragments for tile X follow the primitive fragments of tile Y in the queue. However the HSR logic 2008 may be configured to process the primitive fragments of tile X in order and the primitive fragments of tile Y in order. The method 2200 begins at block 2202 where the HSR logic 2008 determines if there is an exception condition. Specifically, normally the HSR logic 2008 is configured to prioritize primitive fragments in the priority queue 2004 (e.g. process all the primitive fragments in the priority queue 2004 before processing any primitive fragments in the non-priority queue). However, if there is an exception condition then the HSR logic 2008 may process primitive fragments in the non-priority queue 2006 even if there are primitive fragments in the priority queue 2004. Example exceptions include, but are not limited to: the first/top primitive fragment in the non-priority queue 2006 relates to a tile for which the depth buffer is in the depth buffer cache 2012; the depth buffer cache 2012 is full (or almost full); and the number of primitive fragments in the non-priority queue 2006 exceeds a threshold (e.g. the non-priority queue 2006 becomes too full). If the HSR logic 2008 determines that there is not an exception condition, then the method 2200 proceeds to block 2204. If, however, the HSR logic 2008 determines that there is an exception condition then the method 2200 proceeds to block 2206.

At block 2204, the HSR logic 2008 first determines whether there are any primitive fragments in the priority queue 2004. If it is determined at block 2204 that there is at least one primitive fragment in the priority queue, then the method 2200 proceeds to block 2208 where the HSR logic selects the first primitive fragment in the priority queue. The method 2200 then proceeds to block 2216. If, however, it is determined at block 2204 that the priority queue is empty then the method 2200 proceeds to block 2210 where the HSR logic 2008 determines whether there are any primitive fragments in the non-priority queue 2006. If it is determined at block 2210 that the non-priority queue is empty, then the method 2200 proceeds back to block 2202. If, however, it is determined at block 2210 that there is at least one primitive fragment in the non-priority queue 2006 then the method 2200 proceeds to block 2212 where the HSR logic selects the first primitive fragment in the non-priority queue 2006. The method 2200 then proceeds to block 2214 where the HSR logic checks to make sure that the depth buffer for the relevant tile has been loaded from memory. Once it has been determined that the depth buffer has been loaded from memory the method 2200 proceeds to block 2216.

At block 2206 the HSR logic 2008 first determines whether there are any primitive fragments in the non-priority queue 2006. If it is determined at block 2206 that there is at least one primitive fragment in the non-priority queue, then the method 2200 proceeds to block 2212 where the HSR logic selects the first primitive fragment in the non-priority queue 2006. The method 2200 then proceeds to block 2214 where the HSR logic checks to make sure that the depth buffer for the relevant tile has been loaded from memory. Once it has been determined that the depth buffer has been loaded from memory the method 2200 proceeds to block 2216. If, however, it is determined at block 2206 that the non-priority queue 2006 is empty then the method 2200 proceeds to block 2218 where the HSR logic 2008 determines whether there are any primitive fragments in the priority queue 2004. If it is determined at block 2218 that the priority queue 2004 is empty, then the method 2200 proceeds back to block 2202. If, however, it is determined at block 2218 that there is at least one primitive fragment in the priority queue 2004 then the method 2200 proceeds to block 2220 where the HSR logic selects the first primitive fragment in the priority queue. The method 2200 then proceeds to block 2216.

At block 2216, the HSR logic performs full resolution hidden surface removal on the selected primitive fragment.

As described above, when the HSR logic is performing hidden surface removal for a set of primitive fragments associated with a tile the HSR logic may maintain a depth value update map for that tile and a current best depth value buffer for that tile. The depth value update map indicates which pixel sample values have been updated during the processing of the set of primitive fragments, and the current best depth value buffer indicates the 'best' depth values for each pixel sample of the tile to date. When the HSR logic receives or selects a primitive fragment for a new tile then the depth value update map may be initialized to indicate that no depth values have been updated. The current best depth value buffer may also be initialized at this point. However, the initialization may differ depending on whether the depth buffer for that tile has been loaded from memory. If the first primitive fragment did not cause a depth buffer read (e.g. it was in the priority queue) then the values in the current best depth value buffer may be initialized to the 'worst' (e.g. maximum) depth value. If, however the first primitive fragment did cause a depth buffer read (e.g. it was in the non-priority queue) then the values in the current best depth value buffer may be initialized to the values in the depth buffer. If the HSR logic receives or selects a primitive fragment which caused a depth buffer read after one or more pixel sample depth values have been updated, then only those depth values in the loaded depth buffer associated with a pixel sample not marked as being updated in the depth value update map are loaded into the current best depth value buffer.

Performing full resolution hidden surface removal on a primitive fragment may comprise comparing the depth of that primitive fragment (e.g. the Z value or Z co-ordinate) to the corresponding current 'best' depth value for the pixel sample in the tile associated with the primitive fragment. If the depth value of the primitive fragment is better than the current 'best' depth value, then the primitive fragment passes the full resolution depth test and is sent to the tag buffer. The current best depth value buffer is then updated to reflect the new 'best' depth value for the pixel sample and the depth value update map is updated to reflect the fact that the depth value for that pixel sample has been updated. If, however, the depth value of the primitive fragment is worse (e.g. higher) than the current 'best' depth value for the corresponding pixel sample then the primitive fragment fails the full resolution depth test and is discarded (e.g. it is not further processed by the rasterization logic with respect to the current tile).

In some cases, as described above, the coarse depth test logic 320 may be configured to identify those primitive fragments for which a full resolution depth test does not need to be performed (i.e. the depth values of the primitive fragments that do not need to be compared to the current 'best' depth values for the corresponding pixel samples). In these cases, the HSR logic may be configured to, when it receives a primitive fragment that has been identified as not needing a full resolution depth test, simply update the current best depth buffer with the depth value for that primitive fragment (e.g. the Z value or Z co-ordinate) and store an identifier of the primitive fragment in the tag buffer.

After the complete set of primitive fragments for a tile have been processed by the HSR logic the current 'best' depth values which have been updated (as indicated by depth value update map) may be stored in/written to the depth buffer in memory.

Figure 23:
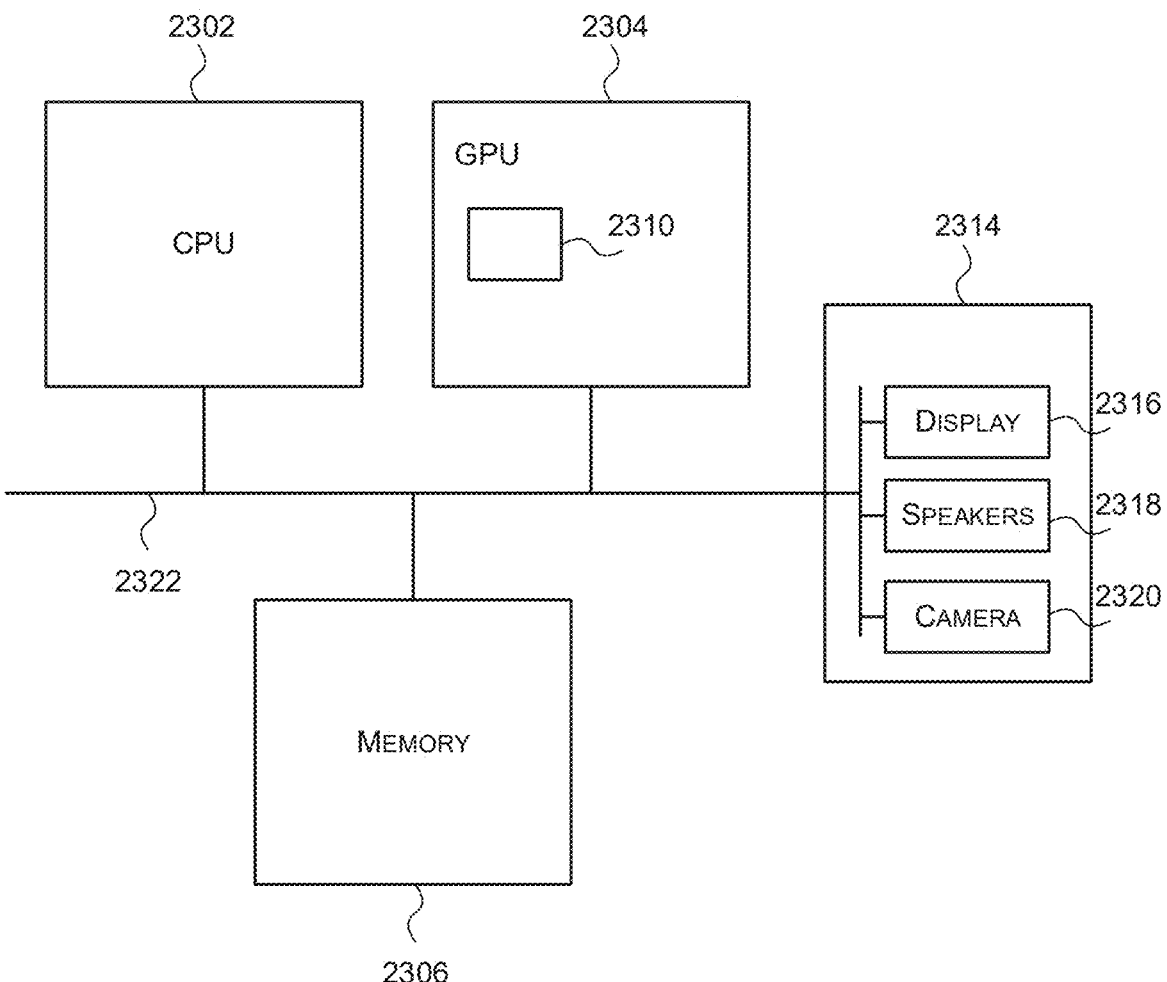
FIG. 23 is a block diagram of an example computer system in which the coarse depth test logic or the graphics processing systems described herein may be implemented.

FIG. 23 shows a computer system in which the coarse depth test logic and/or graphics processing systems described herein may be implemented. The computer system comprises a CPU 2302, a GPU 2304, a memory 2306 and other devices 2314, such as a display 2316, speakers 2318 and a camera 2320. A processing block 2310 (which may correspond to the coarse depth test logic and/or the graphics processing system described herein) is implemented on the GPU 2304. In other examples, the processing block 2310 may be implemented on the CPU 2302. The components of the computer system can communicate with each other via a communications bus 2322.

The coarse depth test logic and graphics processing systems of FIGS. 1-4 and 19-20 are shown as comprising a number of functional blocks. This is schematic only and is not intended to define a strict division between different logic elements of such entities. Each functional block may be provided in any suitable manner. It is to be understood that intermediate values described herein as being formed by the coarse depth test logic or graphics processing system, need not be physically generated by the coarse depth test logic or the graphics processing system at any point and may merely represent logical values which conveniently describe the processing performed by the coarse depth test logic or graphics processing system between its input and output.

The coarse depth test logic and graphics processing systems described herein may be embodied in hardware on an integrated circuit. The coarse depth test logic and graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a coarse depth test logic or graphics processing system configured to perform any of the methods described herein, or to manufacture a coarse depth test logic or graphics processing systems comprising any apparatus described herein. An integrated circuit definition dataset may be, for example, an integrated circuit description.

Therefore, there may be provided a method of manufacturing, at an integrated circuit manufacturing system, a coarse depth test logic or a graphics processing system as described herein. Furthermore, there may be provided an integrated circuit definition dataset that, when processed in an integrated circuit manufacturing system, causes the method of manufacturing a coarse depth test logic or a graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS™ and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a coarse depth test logic or a graphics processing system will now be described with respect to FIG. 24.

Figure 24:
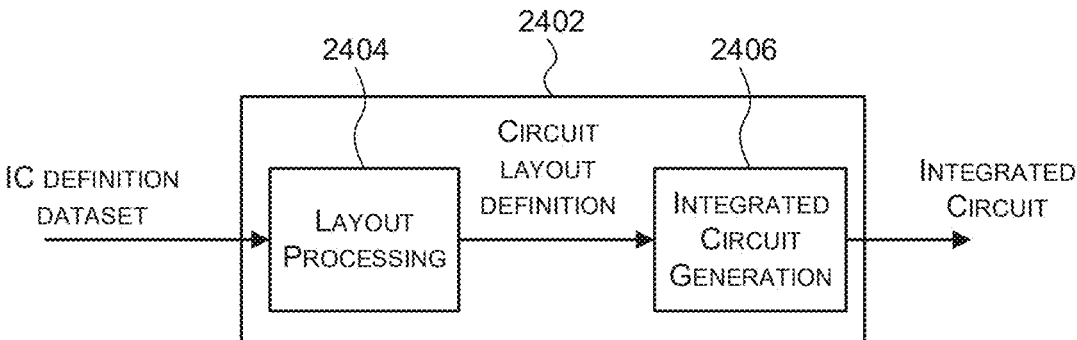
FIG. 24 is a block diagram of an example integrated circuit manufacturing system for generating an integrated circuit embodying the coarse depth test logic or the graphics processing systems described herein.

FIG. 24 shows an example of an integrated circuit (IC) manufacturing system 2402 which is configured to manufacture a coarse depth test logic, or a graphics processing system as described in any of the examples herein. In particular, the IC manufacturing system 2402 comprises a layout processing system 2404 and an integrated circuit generation system 2406. The IC manufacturing system 2402 is configured to receive an IC definition dataset (e.g. defining a coarse depth test logic or a graphics processing system as described in any of the examples herein), process the IC definition dataset, and generate an IC according to the IC definition dataset (e.g. which embodies a coarse depth test logic or a graphics processing system as described in any of the examples herein). The processing of the IC definition dataset configures the IC manufacturing system 2402 to manufacture an integrated circuit embodying a coarse depth test logic or a graphics processing system as described in any of the examples herein.

The layout processing system 2404 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 2404 has determined the circuit layout it may output a circuit layout definition to the IC generation system 2406. A circuit layout definition may be, for example, a circuit layout description.

The IC generation system 2406 generates an IC according to the circuit layout definition, as is known in the art. For example, the IC generation system 2406 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 2406 may be in the form of computer-readable code which the IC generation system 2406 can use to form a suitable mask for use in generating an IC.

The different processes performed by the IC manufacturing system 2402 may be implemented all in one location, e.g. by one party. Alternatively, the IC manufacturing system 2402 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a coarse depth test logic or a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 24 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 24, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. Coarse depth test hardware configured to perform coarse depth testing in a graphics processing system in which a rendering space is subdivided into a plurality of tiles, the coarse depth test hardware comprising:
   front depth test logic configured to:
      receive a set of one or more primitives or a set of one or more primitive fragments related to a tile of the plurality of tiles;
      obtain a depth range for the tile, the depth range for the tile identifying a depth range based on primitives or primitive fragments previously processed for the tile; and
      for at least one primitive of the set of one or more primitives or at least one primitive fragment of the set of one or more primitive fragments:
         make a determination, based on the depth range for the tile, as to whether the primitive or primitive fragment is in front of the primitives or primitive fragments previously processed for the tile according to a depth compare mode, and
         in response to making a determination that the primitive or primitive fragment is in front of the primitives or primitive fragments previously processed for the tile, identifying the primitive or primitive fragment as not requiring a read of a depth buffer to perform full resolution depth testing.

2. The coarse depth test hardware of claim 1, wherein the front depth test logic is further configured to:
   maintain a record of each pixel sample in the tile for which a best depth value is available;
   in response to making a determination that a primitive or a primitive fragment is not in front of the primitives or primitive fragments previously processed for the tile, make a determination as to whether the record indicates that the best depth value is available for each pixel sample in the tile associated with that primitive or primitive fragment;
   in response to making a determination that the record indicates that the best depth value is available for each pixel sample in the tile associated with that primitive or primitive fragment, identify the primitive or primitive fragment as not requiring a read of the depth buffer to perform full resolution depth testing; and
   in response to making a determination that a primitive or primitive fragment has better depth than the primitives or primitive fragments previously processed for the tile, update the record to indicate that the best depth value is available for each pixel sample in the tile associated with that primitive or primitive fragment.

3. The coarse depth test hardware of claim 2, wherein the front depth test logic is further configured to, in response to not identifying a primitive or a primitive fragment as not requiring a read of the depth buffer to perform full resolution depth testing, update the record to indicate that the best depth value is available for each pixel sample in the tile.

4. The coarse depth test hardware of claim 2, wherein the record is a pixel sample map comprising a bit for each pixel sample in the tile that indicates whether or not the best depth value is available for that pixel sample.

5. The coarse depth test hardware of claim 1, wherein the front depth test logic is further configured to:

maintain a record of each pixel sample in the tile for which a best depth value is available;

in response to making a determination that a primitive or a primitive fragment is in front of the primitives or primitive fragments previously processed for the tile:

determine whether the record indicates that the best depth value is available for each pixel sample in the tile associated with that primitive or that primitive fragment, in response to making a determination that the record indicates that the best depth value is not available for any of the pixel samples in the tile associated with that primitive or that primitive fragment, identify the primitive or primitive fragment as not requiring a full resolution depth test, and update the record to indicate that the best depth value is available for each pixel sample in the tile associated with that primitive or that primitive fragment; and in response to not identifying a primitive or primitive fragment as not requiring a read of the depth buffer to perform full resolution depth testing, update the record to indicate that the best depth value is available for each pixel sample in the tile.

6. The coarse depth test hardware of claim 5, wherein the record is a pixel sample map comprising a bit for each pixel sample in the tile that indicates whether or not the best depth value is available for that pixel sample.

7. The coarse depth test hardware of claim 1, wherein the front depth test logic is further configured to:

maintain a record of each pixel sample in the tile for which a best depth value is available;

in response to making a determination that a primitive or a primitive fragment is in front of the primitives or primitive fragments previously processed for the tile:

make a determination as to whether the record indicates that the best depth value is available for each pixel sample in the tile associated with that primitive or that primitive fragment, for each pixel sample in the tile associated with that primitive or that primitive fragment in which the best depth value is not available, identify a corresponding primitive fragment as not requiring a full resolution depth test, and updating the record to indicate that the best depth value is available for each pixel sample in the tile associated with that primitive or that primitive fragment; and in response to not identifying a primitive or a primitive fragment as not requiring a read of the depth buffer to perform full resolution depth testing, update the record to indicate that the best depth value is available for each pixel sample in the tile.

8. The coarse depth test hardware of claim 1, wherein depth range for the tile is defined by a maximum depth value for the tile and a minimum depth value for the tile.

9. The coarse depth test hardware of claim 8, wherein the front depth test logic is configured to determine whether a primitive or a primitive fragment is in front of the primitives or primitive fragments previously processed for the tile by comparing one of the maximum depth value for the tile and the minimum depth value for the tile with one of a maximum depth value of the primitive or the primitive fragment in the tile and a minimum depth value of the primitive or primitive fragment in the tile.

10. The coarse depth test hardware of claim 8, wherein a less-than-depth compare mode is used and the front depth test logic is configured to make a determination as to whether a primitive or primitive fragment is in front of the primitives or primitive fragments previously processed for the tile by determining if a maximum depth value of that primitive or primitive fragment in the tile is less than the minimum depth value of the tile.

11. The coarse depth test hardware of claim 1, further comprising depth range update logic configured to:

record a best depth, based on the depth range for the tile, as a current best depth value;

when the front depth test logic has made a determination that a primitive or primitive fragment is in front of the primitives or primitive fragments previously processed for the tile, receive from the front depth test logic a depth value of that primitive or primitive fragment in the tile from the front depth test logic;

compare the received depth value to the current best depth value;

in response to determining that the received depth value is better than the current best depth value, update the current best depth value with the received depth value; and in response to determining that the front depth test logic has processed each primitive in the set of one or more primitives or each primitive fragment in the set of one or more primitive fragments, update the depth range for the tile to reflect the current best depth value.

12. The coarse depth test hardware of claim 1, wherein the front depth test logic is configured to use the same depth range for the tile for all primitives in the set of one or more primitives or for all primitive fragments in the set of one or more primitive fragments.

13. The coarse depth test hardware of claim 1, wherein the front depth test logic is configured to receive the set of one or more primitive fragments.

14. The coarse depth test hardware of claim 13, wherein the set of one or more primitive fragments comprises primitive fragments generated from a set of one or more primitives determined not to be hidden by the primitives or primitives fragments previously processed for the tile.

15. The coarse depth test hardware of claim 1, further comprising a memory configured to store the depth range for the tile.

16. A graphics processing system comprising the coarse depth test hardware as set forth in claim 1.

17. The graphics processing system of claim 16, further comprising hidden surface removal logic configured to perform full resolution depth testing on the primitives or primitive fragments identified as not requiring a read of the depth buffer without reading the depth buffer.

18. A non-transitory computer readable storage medium having stored thereon a computer readable dataset description of the coarse depth test hardware as set forth in claim 1 that, when processed in an integrated circuit manufacturing system, causes the integrated circuit manufacturing system to manufacture an integrated circuit embodying the coarse depth test hardware.

19. A method of performing coarse depth testing in a graphics processing system in which a rendering space is subdivided into a plurality of tiles, the method comprising:

receiving a set of one or more primitives or a set of one or more primitive fragments related to a tile of the plurality of tiles;

obtaining a depth range for the tile, the depth range for the tile identifying a depth range based on primitives or primitive fragments previously processed for the tile; and for at least one primitive in the set of one or more primitives or at least one primitive fragment in the set of one or more primitive fragments:

making a determination, based on the depth range for the tile, as to whether the primitive or the primitive fragment is in front of the primitives or primitive fragments previously processed for the tile according to a depth compare mode, and in response to making a determination that the primitive or a primitive fragment is in front of the primitives or primitive fragments previously processed for the tile, identifying the primitive or the primitive fragment as not requiring a read of a depth buffer to perform full resolution depth testing.

20. A non-transitory computer readable storage medium having stored thereon computer readable instructions that, when executed at a computer system, cause the computer system to perform the method as set forth in claim 19.

\* \* \* \* \*